(12) United States Patent
Esaki et al.

(10) Patent No.: US 10,194,596 B2
(45) Date of Patent: Feb. 5, 2019

(54) PLANT CULTIVATION FACILITY

(71) Applicant: MITSUBISHI CHEMICAL CORPORATION, Tokyo (JP)

(72) Inventors: Akira Esaki, Tokyo (JP); Akitoshi Yoshimoto, Tokyo (JP); Kazuhiro Yatsukawa, Tokyo (JP); Kazuhiro Hayashi, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 84 days.

(21) Appl. No.: 14/866,821

(22) Filed: Sep. 25, 2015

(65) Prior Publication Data

US 2016/0014977 A1    Jan. 21, 2016

Related U.S. Application Data

(63) Continuation of application No. PCT/JP2014/059300, filed on Mar. 28, 2014.

(30) Foreign Application Priority Data

Mar. 28, 2013   (JP) .................. 2013-069877
Mar. 28, 2013   (JP) .................. 2013-069881

(51) Int. Cl.
   *A01G 9/24*       (2006.01)
   *A01G 9/02*       (2018.01)
   *A01G 31/06*      (2006.01)

(52) U.S. Cl.
   CPC .......... *A01G 9/023* (2013.01); *A01G 9/246* (2013.01); *A01G 31/06* (2013.01); *A01G 9/24* (2013.01); *Y02A 40/264* (2018.01); *Y02P 60/216* (2015.11)

(58) Field of Classification Search
   CPC . A01G 1/00; A01G 9/00; A01G 9/022; A01G 9/023; A01G 9/083; A01G 9/086;
   (Continued)

(56) References Cited

U.S. PATENT DOCUMENTS

2004/0086361 A1*  5/2004  Visser ................ A01G 9/143
                                                    414/267
2005/0268547 A1* 12/2005  Uchiyama ........... A01G 7/045
                                                     47/64
(Continued)

FOREIGN PATENT DOCUMENTS

CN        202617810 U    12/2012
CN        102960198 A     3/2013
(Continued)

OTHER PUBLICATIONS

NL 1024938 (Year: 2005).*
(Continued)

*Primary Examiner* — Thanh Pham
(74) *Attorney, Agent, or Firm* — Oblon, McClelland, Maier & Neustadt, L.L.P.

(57) ABSTRACT

An object of the present invention is to provide an organism cultivation facility suitable for industrial, economical, and large-scale cultivation of an organism by efficient air conditioning which is required for the cultivation of the organism. The object can be achieved with an organism cultivation facility comprising, in a building: a cultivation unit having organism containers capable of storing organisms, and a support structure that supports the organism containers; and a conveying device for the organism containers; wherein the organism cultivation facility has a partition wall(s) that can divide the space of the operating area of the conveying device into two or more spaces in the height direction, and at least a part of the partition wall is movable.

10 Claims, 12 Drawing Sheets

(58) Field of Classification Search
CPC ........ A01G 9/088; A01G 9/14; A01G 9/1415; A01G 9/1423; A01G 9/143; A01G 9/1469; A01G 9/18; A01G 9/20; A01G 9/24; A01G 9/245; A01G 9/246; A01G 9/247; A01G 9/26; A01G 23/02; A01G 31/02; A01G 31/04; A01G 31/06; A01G 31/042; A01G 31/045; A01G 2003/0443; A01G 2003/0452
See application file for complete search history.

(56) References Cited

U.S. PATENT DOCUMENTS

| | | | |
|---|---|---|---|
| 2011/0192082 A1* | 8/2011 | Uchiyama | A01G 9/24 47/66.6 |
| 2011/0302838 A1* | 12/2011 | Chen | A01G 7/045 47/65.9 |
| 2012/0060427 A1 | 3/2012 | Taylor et al. | |
| 2012/0324788 A1 | 12/2012 | Sakura et al. | |
| 2014/0311025 A1* | 10/2014 | Pauls | A01G 9/24 47/17 |
| 2015/0282437 A1* | 10/2015 | Ohara | A01G 7/00 47/66.6 |

FOREIGN PATENT DOCUMENTS

| | | |
|---|---|---|
| EP | 0746194 | 2/1999 |
| GB | 2491162 A | 11/2012 |
| JP | 08-172950 | 7/1996 |
| JP | 11-113419 | 4/1999 |
| JP | 2000-209970 | 8/2000 |
| JP | 2000-287547 A | 10/2000 |
| JP | 2004-329130 A | 11/2004 |
| JP | 2005-21064 | 1/2005 |
| JP | 2011-120555 | 6/2011 |
| JP | 2011-188773 | 9/2011 |
| JP | 2011-20148 | 10/2011 |
| JP | 2011-200148 | 10/2011 |
| JP | 2011-200166 | 10/2011 |
| JP | 2012-120454 | 6/2012 |
| JP | 2012-120455 | 6/2012 |
| JP | 2012-217355 | 11/2012 |
| WO | 95/024119 | 9/1995 |

OTHER PUBLICATIONS

Notification of Transmittal of Translation of the International Preliminary Report on the Patentability dated Oct. 13, 2015, in application No. PCT/JP2014/059300 filed on Mar. 28, 2015.

International Search Report dated Jun. 24, 2014 in PCT/JP2014/059300 filed Mar. 28, 2014.

Complete Plant Factory, Jul. 28, 2010, Nikkei Business Publications, Inc.

Combined Office Action and Search Report dated Dec. 27, 2016 in Chinese Patent Application No. 201480017064.0 (with English translation).

* cited by examiner (7(a))

(7(b))

(7(c))

(7(d))

PLANT CULTIVATION FACILITY

CROSS-REFERENCE TO RELATED APPLICATION

This is a continuation of International Application PCT/JP2014/059300, filed on Mar. 28, 2014, and designated the U.S., (and claims priority from Japanese Patent Application 2013-069877 which was filed on Mar. 28, 2013 and Japanese Patent Application 2013-069881 which was filed on Mar. 28, 2013) the entire contents of which are incorporated herein by reference.

TECHNICAL FIELD

The present invention relates to an organism cultivation facility, for example, a plant cultivation facility.

BACKGROUND ART

Large-scale industrial production of, that is, cultivation of a large amount of, an organism requires a large space for cultivating the organism. Therefore, the land cost is high, and the consumption of the power and the energy for necessary air conditioning is large. As a result, the cost for production of the organism is high, and the production may be unprofitable, which is problematic. This has prevented expansion of the scale of industrial production of organisms requiring strict control of the cultivation environment.

As a solution to this problem, a cultivation unit for cultivation of organisms in which the organisms are stored in a plurality of containers, and the containers are connected to a support structure and vertically stacked has been proposed. For example, in a case where the organism is a plant, a cultivation unit comprising a multistage container for cultivation of the plant is known (Patent Document 1, Non-patent Document 1). Since, by this method, organisms can be cultivated in a relatively small space, the land cost and the energy for air conditioning can be saved.

PRIOR ART DOCUMENTS

Patent Document

[Patent Document 1] JP 2005-021064 A

Non-Patent Document

[Non-patent Document 1] Complete Plant Factory, Jul. 28, 2010, Nikkei Business Publications, Inc.

SUMMARY OF THE INVENTION

Problems to be Solved by the Invention

The present inventors attempted to carry out large-scale cultivation of a plant for protein synthesis, and industrial production of the protein. Since the productivity of the protein by the plant for protein synthesis largely varied depending on the cultivation environment, strict control of the cultivation environment was necessary. However, strict control of the cultivation environment was difficult for known cultivation devices, and therefore efficient protein synthesis was difficult.

In actual cultivation of a plant for protein synthesis, the plant for protein synthesis is cultivated in plant containers placed in a multistage cultivation unit in order to increase the space efficiency. This process requires observation and control of the growth state of the plant, and control and maintenance of cultivation devices related to water by an operator or a technician. Accordingly, the height of the cultivation unit is within the reach of the operator standing on a workbench. As described in Non-patent Document 1, cultivation units having heights of not less than 5 m are also known. However, in such cases, a special space is necessary for the operator or the technician to access the cultivated organisms or the vicinity of the cultivation unit. For example, such cases require a passage or a space sufficient for operation of a lifting device which carries an operator or a technician, or for safely placing a ladder or the like which is to be used by an operator or a technician for working in high places.

Moreover, in cases where organism containers need to be moved in the building during the production process, especially in cases where organism containers placed in a high place in a high cultivation unit need to be handled, a conveying device having a vertical operating area ranging from the floor to the high place, where the containers are placed, needs to be used. Accordingly, a space sufficient for safe operation of the conveying device needs to be secured. That is, the higher the cultivation unit, the more space the cultivation unit requires in its vicinity, so that the site area of the organism cultivation facility and the space which requires air conditioning increase. As a result, an increase in the building cost as a whole and the energy cost cannot be suppressed, which is problematic.

In a study by the present inventors, it was found that a high room height causes unevenness of the conditions of the air in the space, leading to difficulty in allowing uniform growth of organisms such as plants. In general, in cases where air conditioning is carried out in a building having a high room height for placement of a high cultivation unit, air at a relatively high temperature resulting from the convection phenomenon is sucked from the ceiling portion of the building for cooling, or air at a relatively low temperature is sucked from the floor portion of the building for heating. In this process, since the main air flow during the air conditioning is vertically upward or downward, as the length of the passage of the air flow in the space in the building increases due to an increased distance between the ceiling and the floor, suppression of unevenness of air conditioning in the vicinity of organism containers stacked at a position distant from the air flow becomes much more difficult.

Even in cases where an attempt is made to allow the air to flow in the horizontal direction in order to solve this problem, the convection phenomenon perpendicular to the horizontal air flow prevents the attempt, so that the desired effect cannot be obtained. Thus, the height of the cultivation unit inevitably has a limitation from an economic point of view.

Since organisms need to be frequently carried in and out, another possible idea is to use a plurality of floors taking the operability into account, rather than increasing the height of a room. However, even in such a case, there are problems of, for example, an increase in the building cost, a decrease in the density at which the organism containers can be placed in the vertical direction due to the division into the floors, and extreme inefficiency of transportation of the organism containers due to cutting-off of linearity of the work line.

Thus, it has been practically extremely difficult to cultivate an organism whose cultivation environment needs to be strictly controlled, such as a plant for protein synthesis, industrially in a large amount while maintaining economic rationality.

Means for Solving the Problems

The present inventors intensively studied a technique for cultivating an organism whose cultivation environment needs to be strictly controlled, such as a plant for protein synthesis, economically in a large amount while suppressing the production cost. As a result, the present inventors discovered that the above problem can be solved by using an organism cultivation facility placed in a building suitable for environment control, which facility comprises: a cultivation unit in which a number of organism containers can be stored at a high density; a conveying device for transportation of the organism containers, which conveying device is suitable for use in combination with the cultivation unit; and a partition wall that divides the space in the building in an appropriate manner at appropriate times, thereby reaching the present invention.

That is, the first embodiment of the present invention can be summarized as follows.

[1] A plant cultivation facility for cultivating a plant for protein synthesis, comprising, in a building having a floor, wall, and ceiling:
a cultivation unit having plant containers capable of storing plants, and a support structure that supports the plant containers on a plurality of vertically arranged stages;
a conveying device capable of vertically moving the plant containers in the cultivation unit for arranging the plant containers in the cultivation unit;
one or more partition walls that can vertically divide the space in the building excluding the space of the plant cultivation unit into two or more spaces, wherein at least a part of each partition wall has a movable section capable of forming an opening section for allowing vertical movement of the conveying device; and
an air outlet and an air inlet of an air conditioner in at least each of the two or more spaces divided by the partition wall(s).

[2] The plant cultivation facility according to [1], wherein the building is a building in which the space containing the cultivation unit, the conveying device, and the partition wall(s) can be made into a closed system.

[3] The plant cultivation facility according to [1] or [2], wherein the air outlet and the air inlet of the air conditioner are arranged on wall surfaces facing each other in at least each of the spaces divided by the partition wall(s).

[4] The plant cultivation facility according to any one of [1] to [3], wherein the plant cultivation facility comprises a plurality of cultivation unites and the plurality of cultivation units are arranged such that the cultivation units are adjacent to each other along long sides thereof.

[5] The plant cultivation facility according to any one of [1] to [4], wherein the opening section formed by the movable section of the partition wall is provided in a short-side side of the cultivation unit.

[6] The plant cultivation facility according to any one of [1] to [5], wherein the opening section formed by the movable section of the partition wall is provided in the side of the air inlet of the air conditioner with respect to the cultivation unit.

[7] The plant cultivation facility according to any one of [1] to [6], wherein the conveying device is arranged in the space formed between a short side of the cultivation unit and the wall surface facing the short side of the cultivation unit.

[8] The plant cultivation facility according to any one of [1] to [7], wherein the support structure of the cultivation unit has conveying means that moves the plant containers along the long-side direction of the cultivation unit.

[9] The plant cultivation facility according to any one of [1] to [8], wherein the plant for protein synthesis is a plant having a recombinant gene.

[10] The plant cultivation facility according to any one of [1] to [9], wherein, when the partition wall is projected from the direction of the ceiling of the plant cultivation facility, the projected area of the partition wall is not less than 70% of the floor area of the building.

Although the present invention can be preferably applied to plants for protein synthesis, the present invention is applicable not only to plants for protein synthesis, but also to plants and, depending on the purpose, to organisms. That is, the second embodiment of the present invention can be summarized as follows.

[1] An organism cultivation facility comprising, in a building having a floor, wall, and ceiling: a cultivation unit having organism containers capable of storing organisms, and a support structure that supports the organism containers on a plurality of vertically arranged stages; and a conveying device capable of vertically moving the organism containers in the cultivation unit, for arranging the organism containers in the cultivation unit;
wherein the organism cultivation facility comprises a movable partition wall(s) that can divide the space of the operating area of the conveying device into two or more spaces in the height direction.

[2] The organism cultivation facility according to [1], wherein the building is a building in which the space containing the cultivation unit and the conveying device can be made into a closed system.

[3] The organism cultivation facility according to [1] or [2], wherein the building comprises an air conditioning equipment that can control the temperature, humidity, cleanliness, oxygen concentration, and/or carbon dioxide concentration in the space containing the cultivation unit.

[4] The organism cultivation facility according to [3], wherein the air conditioning equipment has an air outlet and an air inlet, and the air outlet and the air inlet are arranged such that the air flow for air conditioning is in the horizontal direction.

[5] The organism cultivation facility according to [3] or [4], wherein the air conditioning equipment has an air outlet and an air inlet, and the air outlet and the air inlet are present in each of the spaces that can be formed by division by the movable partition wall(s).

[6] The organism cultivation facility according to any one of [1] to [5], comprising a fixed partition wall(s) that can divide the space excluding the operating area of the conveying device into two or more spaces in the height direction.

[7] The organism cultivation facility according to [6], wherein the fixed partition wall is a scaffold.

[8] The organism cultivation facility according to [6] or [7], wherein a plurality of the cultivation units are linked through the fixed partition wall.

[9] The organism cultivation facility according to any one of [6] to [8], wherein, when the space of the operating area of the conveying device is divided by the movable partition wall(s) into two or more spaces in the height direction, the movable partition wall is arranged such that the upper surface of the movable partition wall and the upper surface of the fixed partition wall are positioned on almost the same plane, and/or the lower surface of the movable partition wall and the lower surface of the fixed partition wall are positioned on almost the same plane.

[10] The organism cultivation facility according to any one of [6] to [9], wherein the lower surface of the movable partition wall and the lower surface of the fixed partition wall are positioned on almost the same plane.

[11] The organism cultivation facility according to any one of [1] to [10], wherein the horizontal or vertical angle of the movable partition wall can be arbitrarily controlled.

[12] The organism cultivation facility according to any one of [1] to [11], wherein the movable partition wall is placed on a wall of the building.

[13] The organism cultivation facility according to any one of [1] to [12], wherein, when the space of the operating area of the conveying device is divided by the movable partition wall(s) into two or more spaces in the height direction, the movable partition wall has a size which occupies not less than 50% of the horizontal plane of the space of the operating area of the conveying device.

Effect of the Invention

The present invention enables use of a cultivation unit capable of storing organism containers that are stacked high at high density in the height direction in a single space. Moreover, since there is no need to provide a space, such as an inefficient working space or moving space, other than the effective operating space of the conveying device, the distance between a cultivation unit and another cultivation unit adjacent thereto, or between a cultivation unit and a wall, can be reduced, so that the utilization efficiency of the space can be very large.

Moreover, by the present invention, the air flow for air conditioning can be maintained in the horizontal direction while the influence of the vertical convection can be eliminated. Therefore, even in cases where a large number of containers containing an organism such as a plant for protein synthesis which requires strict control of the cultivation environment are vertically and horizontally arranged, the environment in the vicinity of the containers can be controlled with only a very small unevenness.

Further, application of the present invention can realize an extremely favorable operability during observation/maintenance for organism cultivation, maintenance operation of related facilities, and the like, while all properties described above are maintained.

BRIEF DESCRIPTION OF THE DRAWINGS

FIG. 2-1 (*a*) is a schematic cross-sectional view of a partial structure of the organism cultivation facility according to an embodiment of the present invention.

FIG. 2-2 (*b*) is a schematic cross-sectional view of a partial structure of the organism cultivation facility according to an embodiment of the present invention.

FIG. 7-1 is an exemplary diagram of the method of opening and closing the movable partition wall according to an embodiment of the present invention.

FIG. 7-2 is an exemplary diagram of the method of opening and closing the movable partition wall according to an embodiment of the present invention.

FIG. 8-1 is a diagram showing the results of Simulation Example 1.

FIG. 8-2 is a diagram showing the results of Simulation Example 2.

MODE FOR CARRYING OUT THE INVENTION

Figure 1:
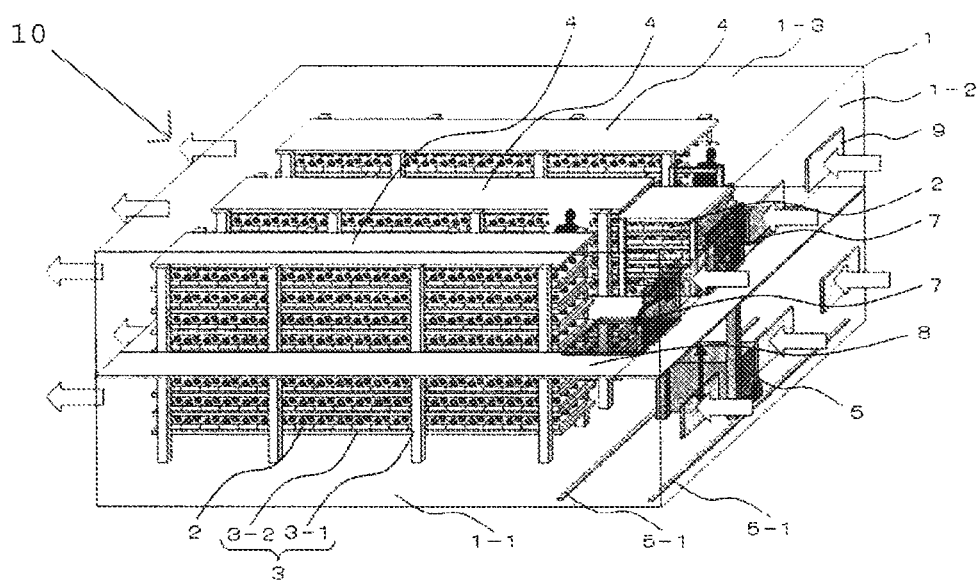
FIG. 1 is a perspective view of the organism cultivation facility according to an embodiment of the present invention.

Embodiments of the present invention are described below in detail with reference to drawings. The present invention is not limited to the contents described below, and may be carried out with arbitrary modifications as long as the modifications do not change the spirit of the present invention. All drawings used for the description schematically show the organism cultivation facility according to the present invention or constituting members thereof, and may include partial emphasis, magnification, reduction, omission, and/or the like for better understanding. Thus, the scale, shape, and/or the like of each constituting member is/are not accurately shown in some cases. Various values used for explanation using the drawings are merely examples, and may be changed in various ways, if necessary. The organism in the following description may be read as a plant for protein synthesis, if appropriate.

The organism cultivation facility according to the present invention is an organism cultivation facility comprising, in a building 1 having a floor 1-1, wall 1-2, and ceiling 1-3: a cultivation unit 4 having organism containers 2 capable of storing organisms, and a support structure 3 that supports the organism containers on a plurality of vertically arranged stages; and a conveying device 5 capable of vertically moving the organism containers 2, for arranging the organism containers 2 in the cultivation unit 4. In addition, the organism cultivation facility according to the present invention comprises, in the building 1, one or more partition walls that can vertically divide the space in the building excluding the space of the cultivation unit into two or more spaces.

In FIG. 1, cultivation units 4 are placed in a building 1 constituted by a floor 1-1, wall 1-2, and ceiling 1-3. Each cultivation unit 4 has a structure in which a plurality of organism containers 2 are vertically supported by a support structure 3 constituted by columns 3-1 and mounting members 3-2. In FIG. 1, the support structure 3 is constituted by the columns 3-1 and the mounting members 3-2. Alternatively, the support structure 3 may be constituted by only the columns 3-1. In such a case, the organism containers 2 are directly fixed to the columns 3-1.

The partition wall comprises a movable partition wall 7, which is a moving element, and a fixed partition wall 8. In FIG. 1, the space in the building 1 is vertically divided into two spaces by a partition wall. The space may also be divided into not less than three spaces by increasing the number of partition walls. Although the fixed partition wall 8 is fixed to the columns 3-1 of the support structure 3, it may alternatively be fixed to the mounting members 3-2, or be integrated with the mounting members 3-2. Further, in cases where the organism containers 2 are fixed to the columns of the support structure 3 or the mounting members 3-2, the fixed partition wall 8 may be fixed to the organism containers 2 directly or through fixation members. The movable partition wall 7 has almost the same thickness as that of the fixed partition wall 8, and is arranged such that the upper surface and the lower surface of the movable partition wall 7 are positioned on almost the same planes as those of the upper surface and the lower surface of the fixed partition wall 8, respectively.

The conveying device 5 is arranged such that the conveying device contacts with a short side of the cultivation unit 4. The conveying device 5 is used for transporting organism containers 2 upward to store the organism containers in the cultivation unit 4. The device can also be used for transporting organism container 2 downward after their removal from the cultivation unit 4. By moving the conveying device 5 along rails for the conveying device 5-1, movement between a plurality of cultivation units 4 can be smoothly carried out. The rail for the conveying device 5-1 is not limited as long as the conveying device 5 is not in contact with the opening section of the partition wall 7 during the operation of the conveying device 5, and may be a guide or a mark. When the conveying device 5 is operated, the partition wall 7 opens upward to become an open state, and makes a space necessary for the operation of the conveying device 5. After the conveying device 5 finishes the operation of storing the organism containers 2 in the cultivation unit 4, the conveying device 5 moves as appropriate, and the movable partition wall 7 closes to become a closed state. By this, the state where the space is divided in the height direction and a plurality of divided environmental spaces are formed can be maintained. By air outlets 9 and air inlets 10 for an air conditioning equipment, which outlets and inlets are arranged on opposing wall surfaces in each divided environmental space, an air flow is formed almost horizontally, and the fixed partition wall 8 and the movable partition walls 7 prevent vertical movement of the air, which is unfavorably caused by the convection phenomenon in the building 1. The air outlets 9 and the air inlets 10 for the air conditioning equipment are preferably provided such that the air flow is formed along the long sides of the cultivation units.

In FIG. 1, the movable partition walls 7 are present in the side of the air outlets 9 of the air conditioning equipment with respect to the cultivation units 4. However, for increasing the efficiency of air conditioning, the movable partition walls 7 are preferably present in the side of the air inlets 10 of the air conditioning equipment with respect to the cultivation units 4. By this, the air supplied from the air outlets 9 can be efficiently applied to the cultivation units 4.

Figures 1, 2:
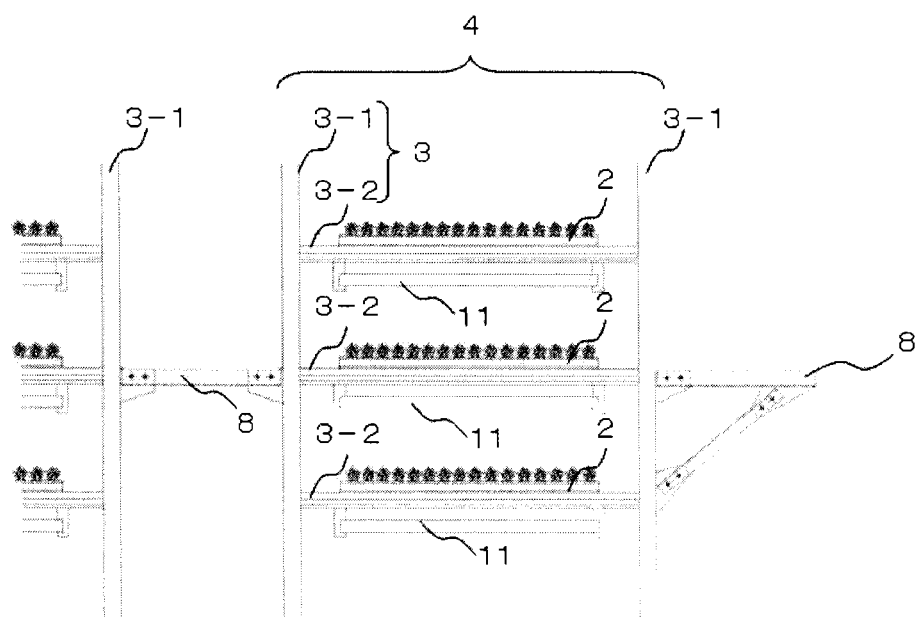
Figure 2:
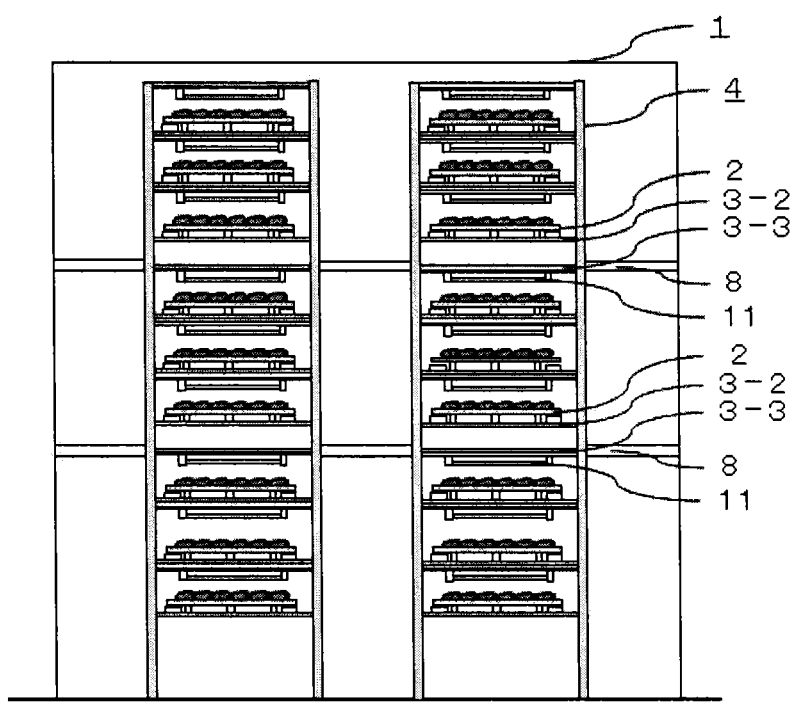

In FIG. 2(a), the cultivation unit 4 has a structure in which a plurality of organism containers 2 are vertically supported by a support structure 3 constituted by columns 3-1 and mounting members 3-2. In FIG. 2, the support structure 3 is constituted by the columns 3-1 and the mounting members 3-2. Alternatively, the support structure 3 may be constituted by only the columns 3-1. In such a case, the organism containers 2 are directly fixed to the columns 3-1.

The fixed partition wall 8 is fixed to the columns 3-1 of the support structure 3. Alternatively, the fixed partition wall 8 may be fixed to a mounting member 3-2, or may be integrated with a mounting member 3-2. Further, in cases where the organism containers 2 are fixed to the columns of the support structure 3 or the mounting members 3-2, the fixed partition wall 8 may be fixed to the organism containers 2 directly or through fixation members. On the lower surface of the mounting members 3-2, lighting equipments 11 (not shown) are fixed. This structure allows radiation of light to the organisms contained in the organism containers 2 for the purpose of their cultivation.

In FIG. 2(a), a plurality of support structures 3 are connected to each other through the fixed partition wall 8. However, the plurality of support structures 3 may be either connected or not connected to each other via the fixed partition wall 8. Although the organism cultivation facility according to the present invention does not need to have a fixed partition wall 8, the organism cultivation facility preferably comprises an organism container 2 that can contain an organism, a support structure 3 that supports the organism container 2, and a fixed partition wall 8 fixed to the support structure 3 and/or the organism container 2.

FIG. 2(b) shows an example of the constitution of the cultivation unit 4 with respect to the position of placement of the fixed partition wall 8, for improvement of the work efficiency. Usually, as shown in FIG. 2(a), in the cultivation unit 4, mounting members and the like interrupt the vertical air flow, and the cultivation unit is constituted such that the upper surface or the lower surface of the fixed partition wall 8 is positioned on almost the same plane as that of the upper surface or the lower surface of the mounting member. Outside the cultivation unit 4, the partition wall interrupts the vertical air flow to allow efficient air conditioning of each divided space.

On the other hand, in FIG. 2(b), reflecting plates 3-3 are newly provided, and the fixed partition wall 8 is arranged such that the upper surface or the lower surface of the fixed partition wall 8 is positioned on almost the same plane as that of the upper surface or the lower surface of the reflecting plate 3-3 rather than the mounting member 3-2.

When an operation is carried out on the fixed partition wall 8, in cases where the upper surface of the fixed partition wall 8 is positioned on almost the same plane as that of the upper surface of the mounting member 3-2, handling of the organism container 2 is difficult since, when the container 2 is carried into, or taken out from the cultivation unit 4, there is no gap between the lower surface of the organism container 2 and the fixed partition wall 8. Accordingly, by arranging the fixed partition wall 8 and the mounting member 3-2 such that the mounting member 3-2 is positioned higher the fixed partition wall 8, and interrupting the vertical air flow in the cultivation unit 4 with the reflecting plate 3-3, the organism container 2 placed on the lowest stage of each divided space can be made easy to handle while the efficiency of air conditioning is maintained.

Figure 3:
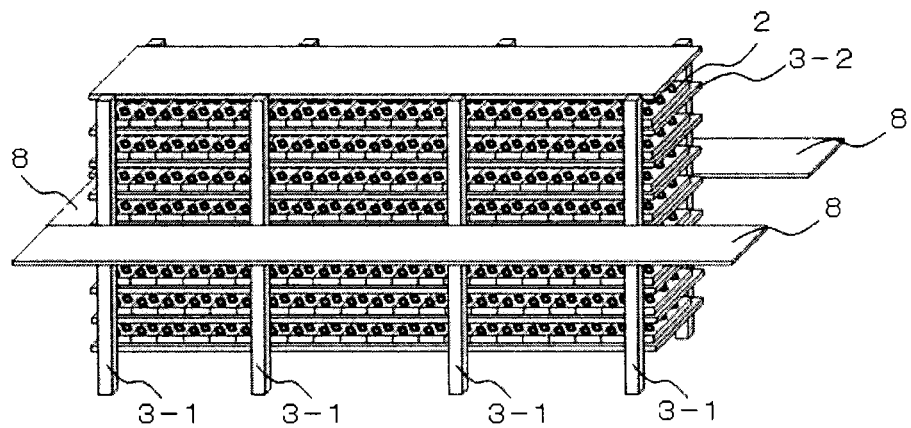
FIG. 3 is a perspective view of the cultivation unit and the fixed partition wall constituting the organism cultivation facility according to an embodiment of the present invention.

In FIG. 3, the support structure is constituted by columns 3-1 and a plurality of mounting members 3-2, and the plurality of mounting members 3-2 are fixed to the columns 3-1. On the mounting members 3-2, organism containers 2 are placed. In FIG. 3, a fixed partition wall 8 is fixed to the columns 3-1, which are part of the support structure 3. In FIG. 3, the fixed partition wall 8 is arranged along 3 out of the 4 sides of each support structure. However, the number of sides along which the fixed partition wall 8 is arranged is not limited, and the fixed partition wall 8 may be formed along at least one side of the support structure.

Figure 4:
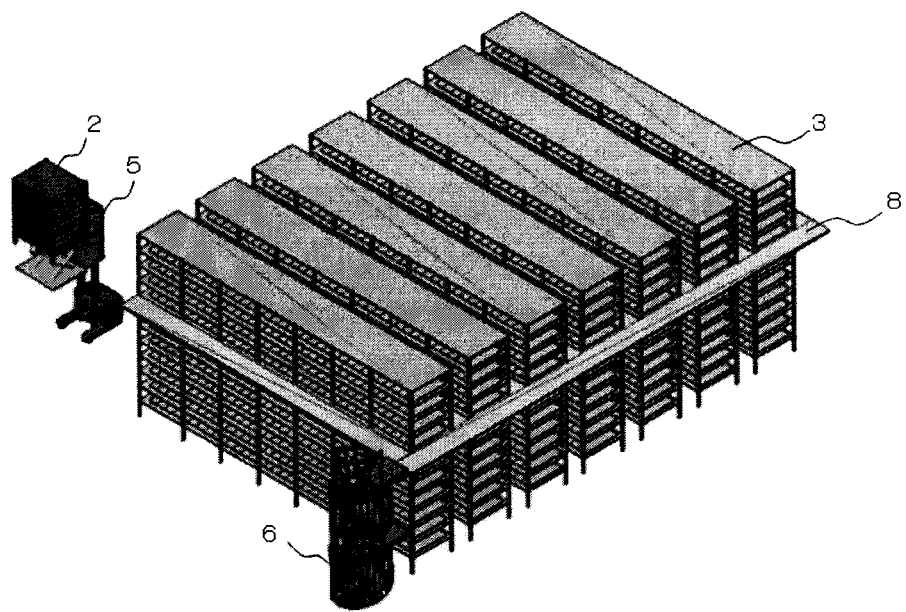
FIG. 4 is a perspective view of organism cultivation facility according to an embodiment of the present invention.

In FIG. 4, a plurality of support structures 3 are linked to each other through a fixed partition wall 8, and all support structures 3 adjacent to each other are linked through the fixed partition wall 8. The support structures 3 in FIG. 4 is composed of, similarly to that shown in FIG. 3, columns and mounting members, and organism containers 2 are placed on the mounting members.

The fixed partition wall 8 is formed along three sides of each of all support structures 3. The fixed partition wall 8 is arranged substantially continuously. With such continuous arrangement, the function of dividing the space can be realized, and, in cases where the fixed partition wall functions as a scaffold, an operator can move freely thereon. The operator can reach the fixed partition wall 8 as a scaffold by climbing from the floor through the stairs 6. Although the stairs 6 are provided at only a single location in FIG. 4, a plurality of stairs 6 may be provided depending on the scale of the organism cultivation facility. In cases where the organism cultivation facility is operated by a plurality of operators, it is preferred to provide stairs 6 at not less than two locations. The stairs 6 are preferably provided at any of the four corners of each of the plurality of support structures 3, from the viewpoint of avoiding disturbance of the air flow.

In FIG. 4, the fixed partition wall 8 is arranged along 3 out of the 4 sides of each support structure 3. In cases where organism containers 2 are carried into, or taken out from the support structure 3 using a conveying device 5 or the like, the fixed partition wall 8 is preferably absent in at least one side of the support structure 3 so that the organism containers 2 can be directly placed in the support structure 3 from the conveying device 5. The type of the conveying device 5 is not limited as long as the conveying device 5 can vertically transport the organism containers 2, and examples of the conveying device 5 that may be used include lifts, forklifts, cranes, and devices for working at high places.

Figure 5:
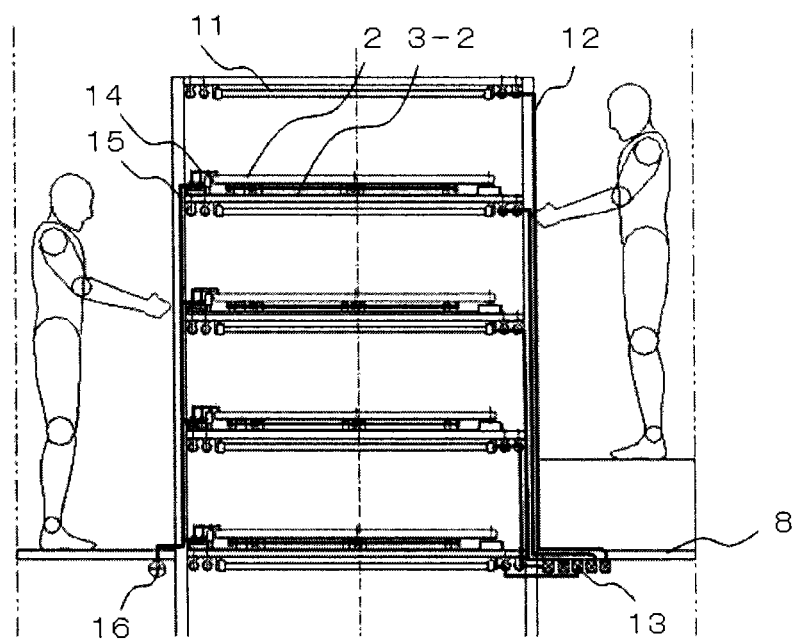
FIG. 5 is a schematic cross-sectional view of the organism cultivation facility according to an embodiment of the present invention.

FIG. 5 shows an example of a structure in which the organism cultivation facility comprises water supply lines 14, 15, and 16, which are equipments for supplying water to organism containers 2, and a lighting equipment 11.

To the support structure, a fixed partition wall 8 as a scaffold is fixed. The figure illustrates, in its left side, a state where an operator is directly standing on the fixed partition wall 8 as a scaffold. Alternatively, as illustrated in the right side of the figure, the operator may stand on a stool placed on the fixed partition wall 8 as a scaffold.

To the lighting equipment 11, which is fixed to the support structure, electric power is supplied by electric wirings 12 and 13. To the organism containers 2, water is supplied through the water supply lines 14, 15, and 16.

Figure 6:
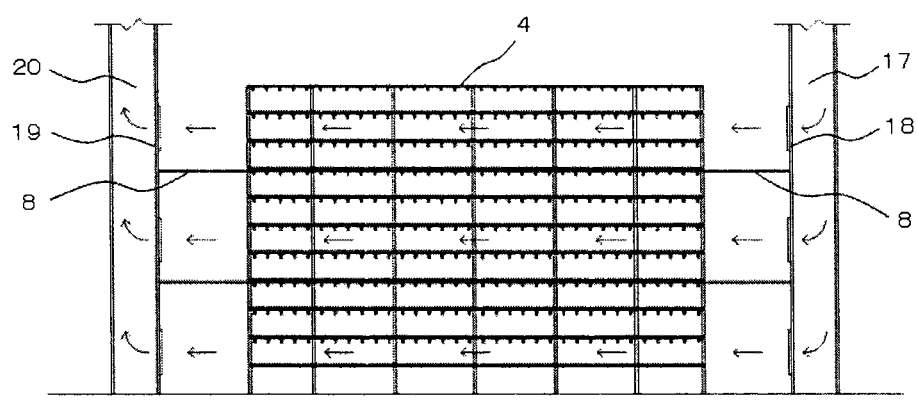
FIG. 6 is a schematic cross-sectional view of the organism cultivation facility according to an embodiment of the present invention.

FIG. 6 shows an example of a structure in which a cultivation unit 4 is placed in a closed building, and an air conditioning equipment is provided. Air generated from the air conditioner (not shown) passes through an air outlet duct 17, and is supplied into the building from an air outlet 18. Air in the building enters the air inlet 19, and then passes through an air inlet duct 20. The air is then returned into the air conditioner, or discharged to the outside of the building. The air outlet duct 17 and the air inlet duct 20 are exposed to the inside of the room, or embedded in a wall. The size and the arrangement of each of the air outlet 18 and the air inlet 19 are preferably appropriately determined so that an optimal air flow can be obtained.

In cases where the air outlet 18 and the air inlet 19 have a mechanism with which the air volume and the wind direction can be controlled, formation and adjustment of the air flow can be easily carried out. The air conditioner, the air outlet duct, and the air inlet duct are preferably integrated into a single unit from the viewpoint of reduction of the cost. These may be placed in only one of the spaces divided by the fixed partition wall 8, or may be placed in each of the spaces divided by the fixed partition wall 8. From the viewpoint of energy efficiency, they are preferably placed in each of the spaces divided by the fixed partition wall 8.

In each space, the air outlet 18 and the air inlet 19 are preferably provided at almost the same height, from the viewpoint of the circulation efficiency. In each space, they are preferably provided almost in the middle in the height direction.

In FIG. 6, the fixed partition wall 8 is in contact with walls of the building. However, the fixed partition wall 8 does not necessarily need to be in contact with walls of the building.

Figure 7:
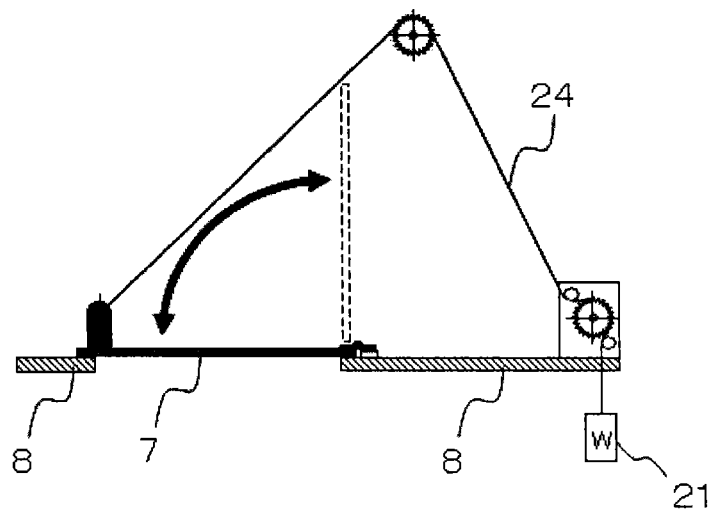
Figure 1:
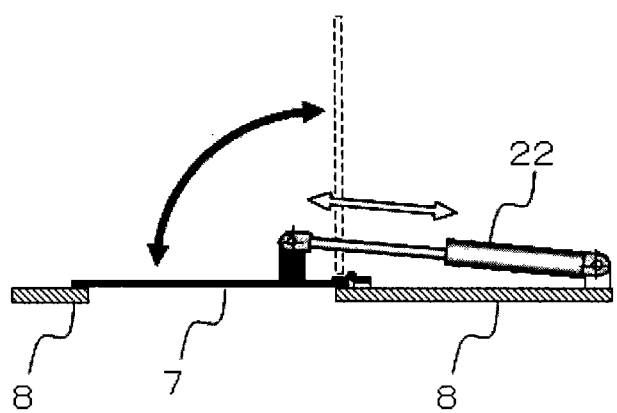
Figure 7:
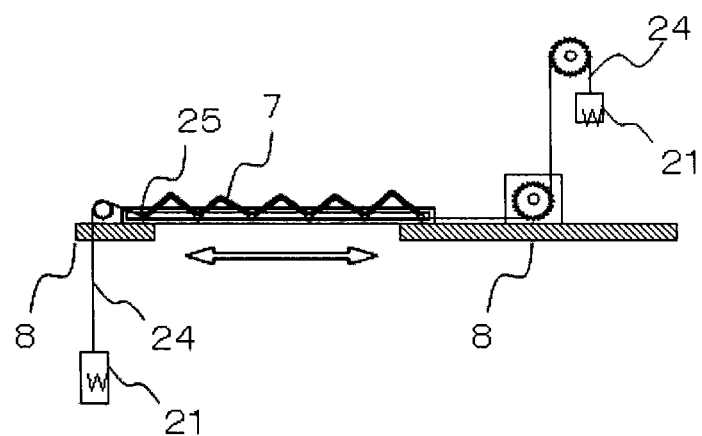
Figure 2:
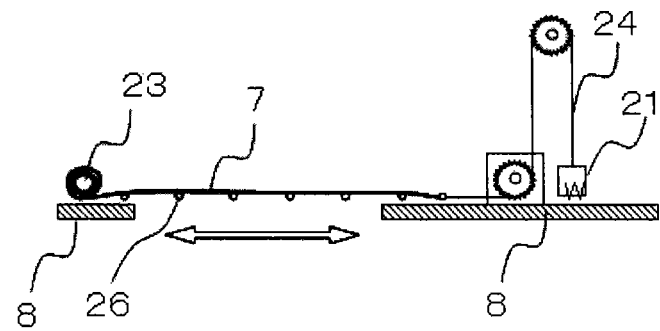

FIG. 7 shows exemplary diagrams of the method of opening and closing the movable partition wall 7 according to the present invention.

In 7(*a*), a method in which a movable partition wall 7 in a closed state is opened and closed with a variable load element 21 is illustrated. The variable load element means a physical mechanism with which the weight or the vertical load can be changed, that is, an actuator, or a combination of an actuator and a balance weight. Specific examples of the actuator include machine elements that convert energy into mechanical work, such as servomotors, AC motors, DC motors, hydraulic motors, hydraulic cylinders, pneumatic cylinders, electric cylinders, and combinations of two or more of these. By applying, using an actuator, tensile stress downward to a wire 24 connected to a movable partition wall 7, the movable partition wall 7 can be made into an open state. By controlling the actuator to change the tensile stress to zero, the movable partition wall 7 can be returned to the closed state. The wire 24 may be replaced with, for example, a chain or a timing belt. As a practical application of this principle, the movable partition wall 7 may be divided into two parts, and an independent variable load element 21 and an independent wire 24 may be connected to each of the divided parts such that the movable partition wall 7 can be made into an open state or a closed state in a double-door-like manner.

In 7(*b*), a method in which a movable partition wall 7 in a closed state is opened and closed with a pneumatic cylinder 22 is illustrated. By controlling pressurization and air release in the inside of the pneumatic cylinder 22 with an electromagnetic valve or the like, the cylinder can be driven to make the movable partition wall 7 into an open state or a closed state.

In 7(*c*), a method in which a movable partition wall 7 in a closed state is opened and closed with variable load elements similarly to 7(*a*) is illustrated. The movable partition wall 7 has a shape with which the movable partition wall 7 can be folded in a bellows-like manner, and is placed on a rail for a movable partition wall 25. The movable partition wall 7 can be made into an open state by opening it rightward using the left variable load element, or by opening it leftward using the right variable load element.

In 7(*d*), a method in which a movable partition wall 7 in a closed state is opened and closed with a variable load element similarly to 7(*a*) is illustrated. The movable partition wall 7 has a shape which allows winding of the movable partition wall 7 into a roll shape, and is arranged such that the movable partition wall 7 is automatically wound around a wind-up section 23 provided with a spring mechanism. By release of the tensile stress which is applied downward to a wire 24 by the variable load element 21, the movable partition wall 7 can be automatically wound around the wind-up section 23, and made into an open state.

Each constitution of the organism cultivation facility according to the present invention is described below in detail.

1. Building 1

The building is used for storing the cultivation unit(s) and keeping conditions of the cultivation environment in the vicinity of the organism containers within predetermined ranges. The building is not limited as long as the building contains the cultivation unit(s) and provides a necessary space(s) such as the space of the operating area of the conveying device in the vicinity of the cultivation unit(s). The space to be controlled for organism cultivation is preferably as small as possible.

The present invention can be suitably used as a facility for industrial cultivation of organisms, and the length of each side of the building is usually not less than 2 m, preferably not less than 3 m, more preferably not less than 4 m, and is usually not more than 30 m, preferably not more than 20 m, more preferably not more than 10 m. The ceiling height is usually not less than 2 m, preferably not less than 2.5 m, more preferably not less than 3 m, and is usually not more than 20 m, preferably not more than 15 m, more preferably not more than 10 m.

In cases where the length and the height are not less than the lower limits described above, organisms can be efficiently cultivated, and, in cases where the length and the height are not more than the upper limits described above, conditions in the building can be more easily controlled. As the room height of the building increases, temperature control becomes more difficult. The height can be set depending on the strictness required for the temperature control. For example, in cases where the temperature is controlled to be within the range of about the desired temperature ±2° C., the height is preferably not more than 10 m. The height may vary depending on the outdoor conditions of the site, and the amount of heat sources in the room such as illumination devices. Depending on the outdoor conditions of the building, the wall surfaces and the roof may be optionally insulated. For the insulation, an insulated material having a thickness of about 40 mm to 200 mm is preferably used.

In terms of the internal size of the building, the space(s) necessary for storing the cultivation unit(s) and for operations such as handling and observation of organisms and maintenance of the cultivation unit(s) need(s) to be formed in the building. For example, the distance between a wall of the building and the cultivation unit closest to the wall is not less than 50 cm, preferably not less than 70 cm. Control of the air flow for air conditioning can be advantageously carried out in some cases if the distance between the highest part of the cultivation unit and the ceiling of the building is not less than 1 m, more preferably not less than 1.5 m.

A single cultivation unit may be present, or a plurality of cultivation units may be present in the building. In cases where a plurality of cultivation units are present, the plurality of cultivation units are preferably arranged such that the cultivation units are adjacent to each other along their long sides.

The walls of the building preferably have heat-insulating properties and air tightness which are sufficient for reasonably controlling the environment for organism cultivation. For example, the floor, the walls, and the ceiling are formed preferably using a plywood in which heat insulating materials are laminated; a material having a low thermal conductivity such as wood or a foamed material, or a plywood material thereof; or the like. The building preferably has air tightness or a structure that prevents invasion of other organisms undesirable for the organism cultivation, such as insects, fungi, microorganisms, and viruses; and dirt and dusts; from the outside.

The inner walls of the building and the fixed partition wall may be in close contact with each other, or may be separated from each other. In cases where the fixed partition wall can be used as a scaffold, and the inner walls are separated from the scaffold, it is preferred to provide a safeguard such as a handrail on the scaffold, from the viewpoint of safe operation by an operator or a technician.

The materials of the inner walls, the ceiling, and the floor of the building are preferably those suitable for the environmental temperature and the environmental humidity for cultivation of organisms. The materials are especially preferably those which hardly suffer from corrosion by water. The materials preferably have flat shapes from the viewpoint of prevention of attachment of dust, dirt, mold, and the like on the surface, and are preferably water-resistant materials so that they can be cleaned by wiping using water or the like even when dust, dirt, mold, or the like is attached. In particular, on the floor, a drainage basin(s) and/or a drainage hole(s) for discharging sewage is/are preferably provided so that cleaning of the floor can be conveniently carried out. In such cases, in order to prevent inappropriate leakage of drainage water, a flow stopper is provided in the opening section, if necessary. The surfaces of the inner walls, the ceiling, and the floor of the building may be subjected to surface treatment, if necessary, in order to provide them with necessary functions.

In cases where the air pressure in the building is kept higher or lower than atmospheric pressure for controlling the environment for organism cultivation, the air tightness of the building is again preferably high. In cases where a fitting in which an opening section is formed is contained in the building, the air tightness of the opening section of the fitting should be especially carefully considered. In cases where an organism requiring a genetic engineering operation, for example, a plant for protein synthesis, is used, the building is preferably capable of providing a closed space containing the cultivation unit and the conveying device.

Because of the requirements described above, panels having heat insulating functions, decorative calcium silicate boards, and the like are preferred as the materials of the ceiling and the walls of the building, and rigid urethane materials and the like are especially preferred as the material of the floor.

In cases where an air conditioning equipment is contained in the building, a space which is sufficient for embedding ducts required for air conditioning such as an air outlet duct 17 and an air inlet duct 20 at positions where these ducts can form an air flow having an appropriate position and an appropriate direction is formed in the building, for realization of appropriate operation and effect of the air conditioning equipment. For example, in cases where the air outlet 18 and/or the air inlet 19 of the air conditioning equipment are placed on a wall(s), the ducts for connecting the air conditioning equipment to the outlet/inlet are embedded such that airways having sufficiently reasonable sizes and simple shapes can be maintained.

2. Cultivation Unit 4

2.1 Organism Container 2

The organism container is a container for cultivating, growing, and/or maintaining an organism. The organism container has a function to retain and/or discharge water, if necessary.

The shape of the organism container is arbitrary, and the organism container preferably has a tray-like shape which is relatively thin in the vertical direction, since the organism containers are preferably vertically stacked at narrow intervals in order to increase the efficiency of the space required for placement of the organism cultivation facility.

Although the organism to be contained is not limited as long as it is an organism, the cultivation facility of the present invention is used preferably for a plant, especially preferably for a leafy plant. In particular, the cultivation facility of the present invention is preferably used for cultivation of plants for pharmaceuticals, drug discovery, food, or health, plants for which the gene recombination technology is used, and plants for protein synthesis, which require relatively strict control within a narrow control range. Among these, the cultivation facility of the present invention is especially preferably used for plants such as leafy vegetables, *Arabidopsis thaliana*, and tobacco, for which results of practical application are accumulated.

The shape of the bottom surface, that is, the shape in the horizontal direction, is not limited, and the shape may be any of a circle, ellipse, and/or polygon. The shape is preferably a tetragon from the viewpoint of the efficiency of using the space. The size in the horizontal direction is not limited. The diameter in cases of a circle, the long diameter in cases of an ellipse, or the length of the longest diagonal in cases of a polygon, is usually not more than 20 m, preferably not more than 5 m, more preferably not more than 2 m, still more preferably not more than 1.5 m, and is usually not less than 10 cm, preferably not less than 20 cm, more preferably not less than 30 cm. The height is usually not more than 2 m, preferably not more than 1 m, more preferably not more than 50 cm, still more preferably not more than 10 cm, and, in terms of the lower limit, the height is usually not less than 5 mm, preferably not less than 1 cm, more preferably not less than 3 cm. In cases where the organism container has a side surface, the side surface preferably has a constant height.

In cases where the size of the organism container is not more than the upper limit described above, the organism can be more easily controlled, and handling such as cleaning of the organism container can be carried out more easily, so that the container can be practically used. In cases where the size of the organism container is not less than the lower limit described above, the space for cultivation of the organism can be secured, and appropriate cultivation of the organism is therefore possible. Moreover, since the number of necessary organism containers can be reduced, the time required for maintenance and control of the organism containers can be suppressed, which is preferred.

If necessary, the organism container may be provided with an inner partition(s), or may contain a plurality of small containers.

If necessary, the container may be given a compartment(s), holding section(s), and/or the like for retaining or fixing an organism(s); and/or a structure(s) for supplying water such as a channel(s), water feed section(s), and/or drainage section(s).

The material of the container is not limited, and examples of the material normally include resin materials such as ABS, vinyl chloride, polypropylene, polystyrene, acrylic resin, polycarbonate, urethane, and polystyrene foam, and alloys and composite filler materials thereof; and metal materials such as carbon steel, stainless steel, and aluminum steel; wood; and glass materials. Among these, resin materials are preferred since they hardly generate components that affect cultivation of organisms.

For better air-conditioning efficiency, the capacity of the container should be the minimum necessary capacity. For obtaining advantageous air flow for air conditioning, the container preferably has a shape in which there are no unnecessary irregularities on the surface. The containers are preferably regularly arranged.

2.2 Support Structure 3

The support structure is used for supporting a plurality of organism containers in the vertical direction. The support may be either fixation or mounting.

The method in the case of fixation is not limited as long as the organism containers are fixed to the support structure with a necessary strength. The organism containers are fixed to the support structure directly, or through connecting members. Specific examples of the method of fixation include screwing, bolting, welding, and adhesion. The fixation of the organism containers to the support structure may be carried out either on a side surface or on the bottom surface of each organism container.

In cases where the fixation is carried out using a connection member, the connection member may be arranged either between the support structure and the side surface of the organism container, or between the support structure and the bottom surface of the organism container.

In cases where the connection member is arranged between the support structure and the bottom surface of the organism container, examples of the arrangement method include a method in which the organism container is arranged directly or indirectly on the upper surface of the later-described mounting member.

The shape of the support structure is not limited, and a column composed of a prism-shaped or rod-shaped material is preferably used.

In cases where the support is carried out by mounting of the organism containers on the support structure, the support structure is constituted by a structure wherein a plurality of members (hereinafter referred to as mounting members 3-2) on which the organism containers can be mounted are fixed, in the vertical direction, to columns 3-1 each composed of a prism-shaped or rod-shaped material. On these members, the organism containers 2 are mounted.

Specific examples of the method for fixing the mounting members 3-2 to the columns 3-1 include a method in which the mounting members 3-2 are fixed to the columns 3-1 directly or through fixation members by screwing, bolting, welding, adhesion, and/or the like.

By providing a plurality of mounting members 3-2 in the vertical direction, and placing organism containers 2 on each of these mounting members 3-2, the organism containers 2 can be stacked in the vertical direction in a multistage manner. Each of the mounting members 3-2 may be provided with a member(s) for aligning the organism containers 2 on its upper surface. Examples of the member(s) include rails.

In cases where the support is mounting, the organism containers can be handled independently from the support structure, so that the organism containers 2 can be carried into the support structure from another place, and can be taken out from the support structure 3 to another place, which is preferred.

From the viewpoint of easily carrying organism containers into the support structure, and easily taking out organism containers from the support structure, the mounting member preferably comprises a roller, rail, belt, and/or the like. The work efficiency can be increased by providing a structure with which the organism containers can be moved simply by applying force to the organism containers in the direction of carrying-in or taking-out of the containers.

Usually, the movement is carried out in the direction connecting the side of the organism container where the conveying device is installed and the opposing side of the container. In cases where the movement can be carried out in the longitudinal direction of the long sides, carrying-in and taking-out of a plurality of mounted organism containers can be carried out without movement of the operator, which is preferred.

The size of the whole cultivation unit, comprising the support structure and the organism containers as constituents, is not limited as long as the organism containers can be appropriately stored. In terms of the maximum length in the horizontal direction, the length of the cultivation unit is usually not more than 100 m, preferably not more than 50 m, more preferably not more than 20 m, still more preferably not more than 15 m, and, in terms of the lower limit, the length of the cultivation unit is not less than 10 cm, preferably not less than 20 cm, more preferably not less than 30 cm. In terms of the upper limit of the height, the height of the cultivation unit is usually not more than 20 m, preferably not more than 10 m, more preferably not more than 8 m, and, in terms of the lower limit, the height of the cultivation unit is usually not less than 1 m, preferably not less than 1.5 m, more preferably not less than 2 m, still more preferably not less than 4 m, most preferably not less than 5 m. In cases where the size of the support structure is not more than the upper limit described above, the space for its placement can be suppressed, so that the air conditioning can be easily carried out, and the operation path during industrial production of organisms can be within an appropriate range. On the other hand, in cases where the size of the support structure is not less than the lower limit, the number of support structures required for cultivation of a certain amount of organism can be suppressed, and the volume of the space required in the vicinity of each support structure can also be suppressed. In terms of the upper limit of the height of the mounting member, the height of the mounting member is usually not more than 50 cm, preferably not more than 15 cm, more preferably not more than 10 cm, still more preferably not more than 5 cm, most preferably not more than 3 cm, and, in terms of the lower limit, the height of the mounting member is usually not less than 1 mm, preferably not less than 3 mm. In cases where the height is not more than the upper limit described above, the weight of the whole support structure can be suppressed, and the installation work for the support structure can be easily done, which is preferred. On the other hand, in cases where the height is not less than the lower limit, sufficient strength for mounting of the organism containers can be easily secured, which is preferred.

The organism containers are preferably arranged in a multistage manner. The number of stages may be, for example, not less than 5, not less than 10, not less than 15, or not less than 20.

The materials of the support structure and the mounting member are not limited, and wood and metal materials such as carbon steel, stainless steel, and aluminum steel are preferably used since these material have high strength. Metal materials are more preferred since they are more stable and have high installation accuracy. In cases where water is used for the organism cultivation, corrosion-resistant metal materials such as stainless steel and aluminum steel, and alloy materials thereof are preferred. For the purpose of preventing corrosion, a metal material subjected to coating, passivation treatment, plating treatment, or the like may also be used as appropriate.

2.3 Lighting Equipment 11

In cases where light is necessary for the organism cultivation, the organism cultivation facility may be provided with a lighting equipment. Specific examples of the cases where light is necessary for organism cultivation include cases where the organism needs the light-dark periods for maintaining its life for a desired period, or for promotion of its growth, cases where a hormone of the organism is to be stimulated to make the organism have a desired shape or grow in a desired direction, and cases where the organism needs light energy for photosynthesis.

Since the light emitted from the lighting equipment needs to be appropriately radiated, depending on the purpose, to the organisms present in the organism containers, the lighting equipment is usually arranged relatively closely to the organism containers. In particular, for observation of growth conditions and maintenance of the organisms by the operator or the technician, the lighting equipment is conveniently arranged above each organism container.

Specific examples of the installation method for the lighting equipment include a method in which the lighting equipment is fixed on the lower surface of another organism container present above the organism container or on the lower surface of a mounting member constituting the support structure, directly or through a fixation member by a method such as screwing, bolting, welding, and/or adhesion, and a method in which a fixation member for the lighting equipment, which member is given a fitting part or an irregular part, is fixed to the support structure by the method described above, and the lighting equipment is then mounted on the fixation member such that the lighting equipment fits the fitting part or the irregular part and stays at a fixed position. In this process, the lighting equipment is preferably arranged such that light is efficiently and uniformly radiated to the cultivated organism. For the purpose of appropriately irradiating the organism with the light emitted from the lighting equipment, a reflecting plate may be used. The reflecting plate is usually arranged behind the lighting section of the lighting equipment, and has a function to reflect light toward a preferred direction when the light is emitted in a direction in which the light can be hardly used for irradiation of the organism. The reflecting plate is not limited as long as it has surface conditions, and/or a color, with high reflectance. A white or milky white metal plate or plastic plate having a smooth surface is usually used. The reflecting plate is fixed to, for example, the support structure of the present invention.

The lighting equipment is not limited as long as the object can be achieved, and a known lighting equipment may be used.

Specific examples of the type of the lighting equipment include sodium lamps, mercury lamps, fluorescent lamps, metal halide lamps, ultraviolet lamps, infrared lamps, far-infrared lamps, microwave applicators, LEDs, electroluminescence, and neon lamps. Among these, fluorescent lamps and LEDs are preferred because of their high luminous efficiency.

Specific examples of the form of the lighting equipment include a form in which a light-emitting part is contained or enclosed in a cylindrical or flat, transparent or semitransparent case in order to increase the efficiency of air conditioning by reducing the installation space. In terms of the upper limit of the horizontal size of the lighting equipment, the size of the lighting equipment is usually not more than 3 m, preferably not more than 2 m, more preferably not more than 1.5 m, and, in terms of the lower limit, the size is usually not less than 30 cm, preferably not less than 50 cm, more preferably not less than 1 m. In cases where the size is too large, the installation work is difficult, which is not preferred. On the other hand, in cases where the size is too small, uneven radiation of light is likely to occur, and the electric wiring required for the lighting equipment is complicated, which is not preferred.

The electrical connection part of the lighting equipment may be subjected to waterproofing by, for example, covering with a cap.

For avoiding disturbance of appropriate control of the cultivation environment for the organism, the lighting equipment preferably has high luminous efficiency and low heat generation. In particular, in cases where the organism cultivation facility of the present invention comprises an air conditioning equipment, and generation of heat due to the illumination is large, the energy required for the air conditioning tends to be large, and an undesirable convection phenomenon is likely to be promoted, which is not preferred.

2.4 Equipment for Water Supply and Drainage

In cases where intermittent or continuous supply of water is required for maintenance of the life of the organism cultivated in the organism cultivation facility of the present invention, an equipment for feeding water therefor may be installed. In particular, in cases where the organism is a plant, an equipment that supplies water at least to the organism container is preferably provided.

The equipment that supplies water comprises a pipe and/or a channel for transportation of water to a predetermined position or height; a tray container for directly supplying water to the organism, or a reservoir storing a water retention agent for retaining water; a pump for moving water; and a tank for storing water. The water retention agent is called medium in cases where the organism to be cultivated is a plant. In most cases, in order to prevent leakage of water, the reservoir is placed such that the water surface can be kept flat.

The size of the equipment for feeding water is a minimum necessary size so that the equipment does not adversely affect the cultivation of the organism; so that, in cases where the lighting equipment is installed, the equipment does not interrupt the path of the light emitted from the lighting to the organism; and so that the equipment does not decrease the efficiency of the air conditioning. The equipment for feeding water is placed such that the space required for its installation is minimum. Specific examples of installation methods which may be employed therefor include a method in which the equipment for feeding water is fixed using a special space provided on a side of the organism container or the support structure or at the bottom of the support structure, directly or through a fixation member by screwing, bolting, welding, adhesion, and/or the like; and a method in which a fixation member given a fitting part or an irregular part is fixed to the organism container or the support structure by the method described above, and the equipment for feeding water is then mounted and fixed on the fixation member such that the equipment for feeding water fits the fitting part or the irregular part and stays at a fixed position. In particular, in cases where the lighting equipment is installed, the connecting portion of the equipment for feeding water needs to be securely connected, and the connecting portion needs to be waterproof, if necessary, for avoiding leakage of water which may cause a short circuit of the electric wiring or electric shock to an operator or a technician. In this case, a waterproof plate may be used. The waterproof plate is not limited as long as it prevents water penetration, and needs to be arranged between a place where water leakage could occur and the lighting equipment such that these are isolated from each other. The waterproof plate is arranged by, for example, a method in which the waterproof plate is fixed to the support structure of the present invention.

The water used in the organism cultivation facility of the present invention may contain a nutrient, and/or a solute and/or a dispersion component for the purpose of pH control, sterilization, condition monitoring, and/or the like. In such cases, the equipment for feeding water may have an auxiliary equipment for realizing a concentration or a dispersion state of the solution, or for monitoring and/or controlling the conditions of the solution. Specific examples of the auxiliary equipment include densitometers, thermometers, pH meters, conductivity meters, and photometers.

The materials of the constituents of the equipment for feeding water excluding the pump, such as the water supply lines 14, 15, and 16, are not limited. Examples of the materials usually include resin materials such as ABS, vinyl chloride, polypropylene, polystyrene, acrylic resin, polycarbonate, urethane, and polystyrene foam; metal materials such as carbon steel, stainless steel, and aluminum steel; wood; and glass materials. Among these, resin materials are preferred since they hardly cause elution of components that affect cultivation of organisms.

2.5 Air-Conveying Device

In the present invention, for effective realization of an environment necessary for cultivation of the organism, an air-conveying device that effectively forms air flow properties including the air flow velocity and the air flow direction is preferably used. The air-conveying device is not limited as long as it is a device that can be used for the purpose of making the environment, including the temperature and the humidity, of the space uniform, and/or for the purpose of improving the ventilation efficiency of the space, by sending air to a distant site in a large space. Examples of the air-conveying device include air blowers comprising an impeller, an electric motor, a casing, and an air regulator.

Since the air-conveying device can be installed by fixation to any of the organism container, the support structure, and the scaffold, desired air flow properties can be more advantageously formed.

2.6 Others

The organism cultivation facility may have conveying means for carrying the organism containers. If the organism cultivation facility has conveying means, the organism containers can be carried into, and taken out from, the cultivation unit by an operation in a single space even in cases where the length of the long side of the cultivation unit is long, and the maintenance can be advantageously carried out. Specific examples of the conveying mean include rollers, belts, chains, and wires. The conveying means is not limited as long as it can carry the organism containers in the cultivation unit.

The organism cultivation facility of the present invention may have an auxiliary equipment for monitoring the organism itself, or the environment in the organism cultivation facility. Specific examples of such an auxiliary equipment include thermometers, hygrometers, aerometers, carbon dioxide-measuring devices, oxygen concentration meters, and particulate meters.

3. Air Conditioning Equipment

The building 1 preferably comprises an air conditioning equipment that can control one or more selected from the group consisting of the temperature, humidity, cleanliness, oxygen concentration, and carbon dioxide concentration in the space containing the cultivation unit 4. As the air conditioning equipment, a known equipment may be used.

In the present invention, for effective realization of a desirable cultivation environment for the organism, the air conditioning equipment is preferably used. As the air conditioning equipment, a common air conditioning equipment may be used, and the equipment is usually constituted by an air conditioner composed of: a filter having a function to remove dusts and microorganisms in air; an air blower for sending air; a heat exchanger, humidifier, and/or dehumidifier for cooling, heating, and/or humidity conditioning of air; and a duct equipment that plays a role as a conveying path for sending air to a desired space.

In cases where the concentrations of oxygen and carbon dioxide need to be controlled for appropriate cultivation of the organism, the concentrations of these gases in the desired space can be made uniform by supplying these gases into a duct equipment, for example, into the air outlet duct 17.

When the later-described movable partition wall is in a closed state in an almost horizontal direction, in order to avoid interference between the movable partition wall and the air flow for air conditioning, the air outlet and the air inlet of the air conditioning equipment are preferably arranged such that the air flow for air conditioning is also in the horizontal direction. In such a case, these outlet and inlet are usually arranged on a wall(s) of the building. Preferably, the air outlet and the air inlet are arranged on opposing walls of the building. In order to avoid disturbance of the air flow for air conditioning, and to avoid a strong unfavorable effect of the convection phenomenon, the air outlet and the air inlet are preferably arranged at positions other than the position of the movable partition wall. In addition, in cases where the organism cultivation facility according to the present invention comprises a fixed partition wall, the air outlet and the air inlet are preferably arranged at positions other than the position of the fixed partition wall.

In cases where the air outlet and the air inlet of the air conditioning equipment are positioned in each of the spaces that can be formed by division by the partition wall(s), air conditioning of the spaces that can be formed by the division can be easily carried out, and the conditions of the air conditioning can be different between the spaces that can be formed by the division. In particular, in cases where operation of only part of the organism cultivation facility is desired, the conditioned air in the divided spaces in operation can be maintained simply by performing air conditioning for those spaces even if the air conditioning for one or more of unoperated divided spaces is stopped. Therefore, the air conditioning energy in the organism cultivation facility as a whole can be effectively saved, which is more preferred.

Conditions for air conditioning are especially important for cultivation of a plant for protein synthesis.

Conditions for air conditioning in cases where a strict cultivation environment is required, such as cases of a plant for protein synthesis, are described below in detail.

In cases of a plant which is generally used such as a food plant or an ornamental plant, the temperature range in which the purpose can be achieved is broad. A temperature change within the range of, for example, about ±10° C. is acceptable in such a plant.

On the other hand, the amount of protein synthesized by a plant for protein synthesis may largely vary depending on the cultivation environment, that is, the atmosphere in the vicinity of the organism container in the cultivation unit in the present invention. This is known by, for example, J. F. Buyel, R. Fischer "Predictive Models for Transient Protein Expression in Tobacco (*Nicotiana tabacum* L.) Can Optimize Process Time, Yield, and Downstream Costs", Biotechnology and Bioengineering, Vol. 109, No. 10, October, 2012. This paper shows a case where the amount of protein synthesized decreased to about ⅓ due to a temperature change of only 5° C.

Accordingly, in cases of a plant for protein synthesis, the temperature is preferably controlled such that variation from the optimum temperature is within the range of usually ±5° C., preferably ±4° C., more preferably ±3° C., still more preferably ±2.5° C., especially preferably ±2° C. By controlling the temperature variation to be within this range, a desired protein can be efficiently synthesized in the organism cultivation facility as a whole. That is, with the organism cultivation facility of the present invention, appropriate conditions for air conditioning can be easily set, and the facility is suitable for carrying out cultivation of a plant for protein synthesis that requires strict control of the temperature. Although the organism cultivation facility of the present invention is suitable for plants for protein synthesis, its application to other organisms should not, of course, be prevented.

For carrying out the strict temperature control, more specifically, for controlling the temperature within the preferred range described above, the conditioned air supplied from the air outlet reaches the organism container at an air flow velocity of not less than 0.2 m/s, preferably not less than 0.3 m/s, more preferably not less than 0.5 m/s, and of usually not more than 2.0 m/s, preferably not more than 1.8 m/s, more preferably not more than 1.5 m/s. In cases where the air flow velocity is not less than the lower limit described above, the atmosphere in the vicinity of the organism container can be appropriately controlled, and, in cases where the air flow velocity is not more than the upper limit, the possibility of inhibition of the cultivation by wind can be reduced. With an appropriate air flow velocity, photosynthesis and protein synthesis can be promoted.

The temperature of the conditioned air supplied from the air outlet is usually not less than the indoor design temperature−20° C., preferably not less than the indoor design temperature−18° C., more preferably not less than the indoor design temperature−15° C., and is usually not more than the indoor design temperature−5° C., preferably not more than the indoor design temperature−8° C., more preferably not more than the indoor design temperature−10° C. In cases where the temperature of the conditioned air supplied from the air outlet is not less than the lower limit described above, unevenness of the temperature, and condensation can be prevented. In cases where the temperature is not more than the upper limit, better controllability can be obtained, and the air volume can be prevented from becoming too large.

The size of the air outlet is not limited as long as the above-described conditions can be realized. The long diameter of the air outlet is usually not less than 5 cm, preferably less than 10 cm, more preferably not less than 20 cm, and is usually not more than 10 m, preferably not more than 5 m, more preferably not more than 3 m, still more preferably not more than 2 m.

In terms of the shape of the air outlet, preferred examples of the air outlet include those for plane air blowing, those having a grid plate provided with blades in the longitudinal or transverse direction (universal type), and those in the shape or a panel in which the air-outlet surface is provided with a porous plate. Air outlets for point air blowing (nozzle type, and conical type utilizing air induction (anemostat type/pan type)), and air outlets for linear air blowing (slot type) may also be used.

The effect of the organism cultivation facility of the present invention is described below based on simulations of the indoor temperature distribution using models of the organism cultivation facility.

The simulations were carried out under the same conditions described below to investigate the difference in the temperature distribution depending on the presence or absence of a partition wall. The results are visualized and shown in FIG. 8.

<Conditions>
  Outdoor temperature: 35° C.
  Size of building: length, 9.4 m; width, 3.9 m; height, 6.1 m
  Insulation of building: 40-mm thickness urethane foam insulating panel
  Size of cultivation unit: length, 7.2 m; width, 2.2 m; height, 5.9 m
  Number of stages of organism containers: 9
  Installation height of partition wall: 2.5 m (first stage) and 4.15 m (second stage)
  Installation ratio of partition wall: 80% of the floor area of the building, as determined by projecting the partition wall from the direction of the ceiling of the organism cultivation facility
  Air outlet
  Air blow-off velocity: 1.0 m/s
  Air volume: 2600 cmh/air outlet
  Size: height, 1200 mm; width, 600 mm
  Number of air outlets: 4 air outlets×3 rows
  Height: 1.8 m, 3.5 m, and 5.2 m, in terms of the positions of the centers
  Distance between air outlets: 600 mm
  Air inlet
  Air intake velocity: 1.0 m/s
  Air volume: 2600 cmh/air inlet
  Size: height, 1200 mm; width, 600 mm
  Number of air inlets: 4 air inlets×3 rows
  Height: 1.8 m, 3.5 m, and 5.2 m, in terms of the positions of the centers
  Distance between air inlets: 600 mm
<Calculation Method>

Using simulation software FlowDesigner (Advanced Knowledge), calculation was carried out for the conditions described above. In Case 1, the temperature distribution in a building having no partition wall was calculated as a comparative example. In Case 2, the temperature distribution in a building was calculated in the same manner as in Case 1 except that a partition wall was provided.

<Calculation Results>
<Case 1>

Figures 1, 8:
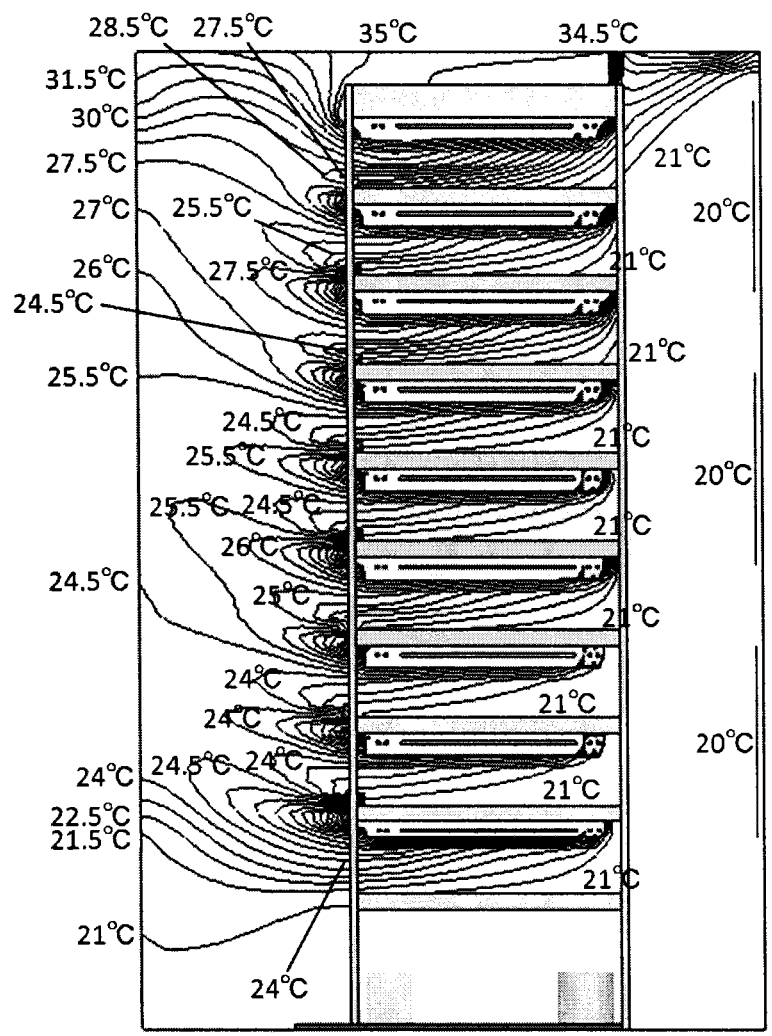
Figures 2, 8:
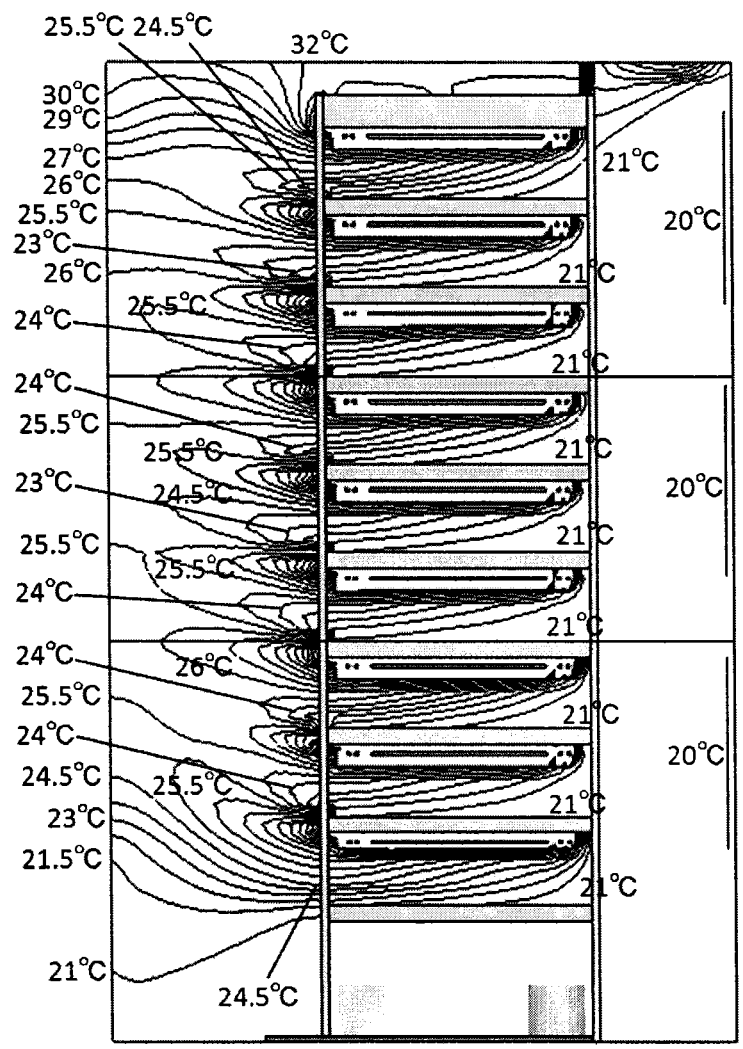

The calculation results are shown in FIG. 8. The temperature distribution in the building was 21 to 35° C., and the temperature in the air-inlet side on the surface of the organism containers was 24 to 27.5° C. The surface temperature of the organism containers was 21 to 27.5° C. (24.25° C.±3.25° C.).

<Case 2>

The calculation results are shown in FIG. 8. The temperature distribution in the building was 21 to 32° C. The temperature in the air-inlet side of the organism containers was 24.5 to 25.5° C., which indicates very good control of the temperature. The range of the temperature on the surface of the organism containers was 21 to 25.5° C. (23.25° C.±2.25° C.), which again indicates very good control of the temperature.

It is generally known that the vertical temperature distribution is large in a large space. The calculation results in Case 1 is consistent with this fact. On the other hand, by vertically dividing a space with a partition wall and providing air flows in the horizontal direction, temperature control is possible.

In cases of cultivation of a plant, especially in cases of cultivation of a plant for protein synthesis, it is important to control the environment such that the values for a plurality of conditions including the temperature, humidity, air flow, and $CO_2$ concentration are within specific values. Optimum environmental conditions vary depending on the species of the plant and the cultivation process (germination, cultivation, and, in cases of a plant for a pharmaceutical, the expression process of a protein, and the like). In the present invention, highly accurate environmental conditions (in which, for example, changes in the temperature fall within the range of ±2.5° C.) can be realized simply by designing the facility such that representative parameters including the sizes and arrangement of the air control openings (air outlet and air inlet), wind velocity, diffusion rate, and blow-off temperature difference can be adjusted taking into account the internal heat generation, the shape of the cultivation facility, the room height, and the like.

In the present simulations, the estimation was carried out assuming a situation in which temperature control in the vicinity of the organism containers is difficult, and high-output type fluorescent lamps are arranged over the entire plane of the cultivation rack at intervals of 100 mm. Normally, the intervals at which the fluorescent lamps are arranged are longer than those in the assumption in the present calculation, and heat generated by lighting is removed at a certain ratio in the process of transpiration by plants. Accordingly, the temperature difference in the rack is thought to be smaller than that in the present calculation results. Thus, both optimum cultivation illumination and environmental control (in which, for example, changes in the temperature fall within the range of ±2.5° C.) can be achieved irrespective of the number of illumination devices which may be fluorescent lamps, LEDs, or the like.

In Case 2, since the temperature in the air-inlet side of the organism containers can be controlled very well, there is a high possibility that a plurality of rows of cultivation rack equipments can be placed in the building.

From the results of Case 1 and Case 2 in the simulations described above, it can be understood that the presence of the partition wall may allow reduction of the temperature control range by 1° C., that is, reduction of the temperature fluctuation range by 2° C. Taking into account the description in the paper in Biotechnology and Bioengineering mentioned above (the case where the amount of protein synthesized decreased to about ⅓ due to a temperature change of only 5° C.), it can be calculated that the decrease in the amount of protein synthesized can be suppressed by not less than 20% by the presence of the partition wall. It is surprising that such a decrease in the productivity can be prevented by the presence of the partition wall.

4. Conveying Device 5

The organism cultivation facility according to the present invention comprises as a constituent the cultivation unit that can store a large number of organism containers at a high density. In order to realize, efficiently in a short time, the industrial operations of loading the large number of organism containers on the cultivation unit and collecting the containers from the cultivation unit, the organism cultivation facility comprises a conveying device which is arranged in the vicinity of the cultivation unit and can be operated to move vertically. In cases where the height of the conveying device is not less than 2 m, the device preferably has a function with which the device can be run or drawn, manually or automatically.

During the conveying operation, the conveying device is arranged on the floor surface in the vicinity of the cultivation unit or on a stool appropriately placed on the floor surface. On the conveying operation section of the conveying device, one or more organism containers can be loaded at once, and the conveying device has a function to move the operation section upward and downward while the containers are loaded thereon. This function is used to carry out the industrial operations of loading organism containers from the vicinity of the floor surface onto a relatively high position in the cultivation unit, for example, a position at a height of 1.5 m to not less than 2 m which is beyond the reach of the operator or the technician, and, conversely, collecting the organism containers from the relatively high position to the vicinity of the floor surface.

The operation section may have a plurality of stages for loading organism containers, and/or may have a function to modify the positional relationship between the operation section and the cultivation rack in terms of the height and/or the horizontal direction, for the purpose of simplifying handling of organism cultivation containers. The operation section may also have a safety function for preventing falling of organism containers and/or falling of parts required for loading organism containers.

The conveying device preferably has a compact size without having unnecessary elements that are not involved directly in transportation of the organism containers. In addition, the conveying operation section is preferably of a type that operates in the vertical direction. The operation section may have a function to carry, in addition to the organism containers, an operator or a technician to move them to the upper part of the cultivation unit or to a scaffold.

From the viewpoint of maximizing the time during which the later-described movable partition wall is in a closed state, that is, from the viewpoint of minimizing the time during which the movable partition wall is in an open state, the conveying device is preferably capable of reducing the tact time for handling of the organism containers. More specifically, the velocity of movement of the conveying device in the vertical direction is preferably high, and the device preferably does not require operation switching time or the like that is not directly related to the handling operation. The velocity of movement of the conveying device in the vertical direction is preferably 5 cm/second, more preferably 10 cm/second, still more preferably 15 cm/second, most preferably 20 cm/second.

By use of a conveying device having the above function, a large number of organism containers can be handled even if the space used is limited. Therefore, the space required for the operation, that is, the space of the operating area can be minimized, and, in addition, the space required in the vicinity of the cultivation unit for handling of the organism containers can be minimized while the operability can be maintained.

In terms of the size of the conveying device, the maximum width of the body in the horizontal direction is usually not more than 3 m, preferably not more than 2.5 m, more preferably not more than 2.3 m. The height of the device is usually not more than 3 m, preferably not more than 2.5 m, more preferably not more than 2.3 m, when the device is not operating and is in the state where the height is minimum. In cases where the conveying device is too large, the space required for installation and operation of the conveying device is too large, so that the efficiency of air conditioning in the building is low, which is not preferred.

The maximum height at which the organism containers are lifted during the operation of the conveying device is not less than 1.5 m, preferably not less than 2 m, more preferably not less than 4 m, still more preferably not less than 5 m.

Specific examples of the conveying device include elevating conveyance devices and construction equipments for working at high places, selected from the group consisting of lifts, forklifts, escalators, elevators, cranes, conveyors, robots, pulleys, sprockets, wires, and chains, which may be used singly or as a combination of two or more of these.

In cases where a plurality of cultivation units are arranged such that they are adjacent to each other along their long sides, the conveying device may be provided for each cultivation unit. Alternatively, in cases where the conveying device can be arbitrarily moved in the horizontal direction, a single conveying device may be sufficient. In such cases, each cultivation unit is preferably provided with a rail or a guide that guides the conveying device to the place where the conveying device is to be operated.

5. Movable Partition Wall 7

The organism cultivation facility according to the present invention has a movable partition wall for reasonably and sufficiently realizing a cultivation environment for an organism, especially an organism that requires strict control of the cultivation environment, for example, a plant for protein synthesis. The movable partition wall is used when the conveying device is not operated. The movable partition wall is arranged in the space of the operating area of the conveying device when it is used, and has a function capable of dividing the space of the operating area into two or more spaces in the height direction.

Examples of the method of dividing the space of the operating area include a method in which the film or the plate required for the division itself is stored outside the space to be in an open state when the conveying device is operating, that is, when the movable partition wall is not operating, while the film or the plate is moved to an expected position to be in a closed state only when the conveying device is not operating, that is, only when the movable partition wall is operating, a method in which the film or the plate is movable in a blind-like manner, and the film or the plate is in an open state when the movable partition wall is not operating, while the film or the plate is in a closed state only when the movable partition wall is operating, and a method in which the film or the plate is a flexible material, and the film or the plate is wound to outside the space to be in an open state when the movable partition wall is not operating, while the film or the plate is stretched to an expected position to be in a closed state only when the movable partition wall is operating.

That is, in the movable partition wall according to the present invention, being "movable" means moving, opening/closing, and winding/stretching. The movable partition wall may be operated either automatically or manually. Preferably, the position of the movable partition wall can be controlled to an arbitrary angle in the horizontal direction or the vertical direction.

The place where the movable partition wall is installed is not limited. The movable partition wall is preferably installed on a wall(s) of the building from the viewpoint of stable operation.

During use of the conveying device, the movable partition wall does not operate, and an opening is formed in the fixed partition wall so that the conveying device can move upward and downward through the partition wall. The opening section of the partition wall formed when the movable partition wall is not operating is usually provided in the vicinity of the cultivation unit, and preferably provided in a short-side side of the cultivation unit. By such a constitution, the conveying device is preferably arranged in the space formed between the short side of the cultivation unit and the wall surface of the building opposing to the short side of the cultivation unit. The opening section of the partition wall is preferably present in the side of the air inlet of the air conditioner with respect to the cultivation unit. By this, disturbance of the air flow that may affect the organism can be prevented.

The material of the movable partition wall is not limited as long as the movable partition wall exerts its function. Examples of the material of the movable partition wall include cloth materials, wooden boards, plastic films and sheets, and metal plates, and laminate plates and laminate sheets composed of a layer(s) of one or more of these materials and a layer(s) having heat insulating function, such as a foam material layer(s), since these materials have light weight and can reduce the thickness of the movable partition wall. A single movable partition wall may exert its function in each single place, or a combination of a plurality of movable partition walls may exert their function in each single space. Examples of cases where a plurality of movable partition walls are used in combination include cases where the movable partition walls have a door-like shape or a blind-like shape.

In the division of the space with a movable partition wall(s), the space may be completely divided, or a part of the space may be divided. When each movable partition wall is in a closed state during its operation, that is, when the space of the operating area of the conveying device is divided by the movable partition wall(s) into two or more spaces in the height direction, the size of the movable partition wall corresponds to usually not less than 50%, preferably not less than 70%, more preferably not less than 80%, still more preferably not less than 90%, especially preferably not less than 95%, most preferably 100% of the plane in the horizontal direction of the space of the operating area of the conveying device.

Only when the conveying device is operating, the movable partition wall of the organism cultivation facility according to the present invention is in an open state, and allows free operation of the conveying device. When the conveying device is not operating, the movable partition wall is in a closed state, and the state where the space is divided is maintained except for cases where an open state is especially required.

When the conveying device is not operating, and the movable partition wall(s) is/are in a closed state and dividing the space, each movable partition wall in the closed state is preferably in a state where the wall is almost horizontally closed. Since, in this state, the operating space of the conveying device is divided by the movable partition wall(s) into a plurality of spaces in the vertical direction, undesirable vertical movement of air resulting from the convection phenomenon in the building can be prevented.

In a case where the organism cultivation facility according to the present invention has an air conditioning equipment, where its air outlet and air inlet are installed on a wall(s), and where the air flow for the air conditioning is in an almost horizontal direction, the movable partition wall in the closed state is preferably in a state where it is almost horizontally closed similarly to the above-described case since, in such a state, the air flow for the air conditioning is less likely to be disturbed, and less likely to suffer from a strong unfavorable effect of the convection phenomenon.

The movable partition wall in the closed state during its operation preferably has a simple shape, and is preferably located at an appropriate position where the air flow from the air conditioner is not disturbed. More specifically, the movable partition wall preferably does not have unnecessary projections or irregularities that may cause disturbance of the air flow, and is preferably arranged at an angle/position at which the air flow is not reduced, or at an angle/position at which undesirable convection is not promoted.

In cases where the organism cultivation facility according to the present invention has the later-mentioned fixed partition wall 8, and the space of the operating area of the conveying device is divided by a movable partition wall(s) into two or more spaces in the height direction, the movable partition wall according to the present invention is preferably arranged such that the upper surface of the movable partition wall and the upper surface of the fixed partition wall are positioned on almost the same plane, and/or the lower surface of the movable partition wall and the lower surface of the fixed partition wall are positioned on almost the same plane. More preferably, the movable partition wall is arranged such that the lower surface of the movable partition wall and the lower surface of the fixed partition wall are positioned on almost the same plane.

Still more preferably, when the lower surface of the movable partition wall, the lower surface of the fixed partition wall, and the lower surface of the organism container or the lower surface of the plate material of the support structure of the cultivation unit are arranged on almost the same plane, or the upper surface of the movable partition wall, the upper surface of the fixed partition wall, and the upper surface of the organism container or the upper surface of the plate material of the support structure of the cultivation unit are arranged on almost the same plane, to form a divided environmental space surrounded by the "almost the same plane", walls, and the floor or the ceiling, a divided environmental control space can be realized by arranging an air outlet and an air inlet for air conditioning exclusively for the divided environmental space. This means that the same effects and functions as those realized by division of the room can be realized while all disadvantages of the division of the room are solved.

That is, since the space is divided merely by the partition walls, and there is no need to divide the space into floors, the building cost can be reduced. Moreover, since the cultivation unit does not need to be divided, its equipment cost and the cost for its auxiliary utilities can be reduced, and maintenance of the cultivation unit and handling and monitoring of the stored organisms can be easily carried out. In addition, since the conveying device for handling of the organism containers can be shared among a plurality of spaces in the present invention, the equipment cost for the device can be reduced.

Since each divided environmental control space can have independent air conditioning, one or more factors selected from the group consisting of the temperature, humidity, cleanliness, oxygen concentration, and carbon dioxide concentration may be differently controlled among the divided environmental control spaces. As a result, even in cases where the production scale is increased and a large amount of organisms are cultivated in the organism cultivation facility according to the present invention, the density of the organism containers contained in the building can be maximized while favorable operability can be secured in handling of the organism containers, and the power and the energy consumed for the strict environmental control by air conditioning can be economically and reasonably saved. That is, organisms requiring strict environmental control can be industrially cultivated in a large amount while the economical efficiency is maintained.

From the viewpoint of ease of air conditioning of the divided spaces, the number of stages of the organism containers in each divided space is usually not more than 20, preferably not more than 18, more preferably not more than 15, still more preferably not more than 10. From the viewpoint of improvement of the space efficiency, the number of stages is usually not less than 1, preferably not less than 2, more preferably not less than 3.

6. Fixed Partition Wall 8

The fixed partition wall is a partition wall for carrying out air conditioning in the building together with the movable partition wall. The present invention has a movable partition wall(s) that can divide at least the space of the operating area of the conveying device into two or more spaces in the height direction. The whole area to be divided into the two or more spaces in the height direction may be divided by the movable partition wall(s), but, by providing a fixed partition wall in the space of the area where the conveying device is not operated, arrangement of the partition walls can be efficiently carried out. In particular, in cases where the fixed partition wall has a specific positional relationship with the above-mentioned movable partition wall, the environmental control for the organism cultivation can be carried out very advantageously. More specifically, in cases where at least one surface of the movable partition wall and at least one surface of the fixed partition wall are positioned on almost the same plane, the air flow in the height direction resulting from convection can be efficiently prevented, which is preferred.

In particular, in cases where the lower surface of the movable partition wall and the lower surface of the fixed partition wall are positioned on almost the same plane, the air at a relatively high temperature that accumulates on the lower surface of the fixed partition wall due to convection can be reasonably and effectively prevented from moving further upward. In cases where the organism cultivation facility of the present invention comprises an air conditioning equipment, the air in the building is artificially changed, and therefore, in some cases, an undesirable air movement in the vertical direction may occur due to a very large-scale convection phenomenon. By the above-described positional relationship, such an undesirable air movement can be effectively prevented.

The fixed partition wall preferably has a simple shape that does not disturb the air flow for air conditioning, and is preferably placed at an appropriate position. More specifically, the fixed partition wall preferably does not have unnecessary projections or irregularities that may cause disturbance of the air flow, and is preferably arranged at an angle/position at which the air flow is not reduced, or at an angle/position at which undesirable convection is not promoted.

The "almost the same plane" means that the distance between the surfaces at the border is not more than 1 m, preferably not more than 50 cm, more preferably not more than 20 cm, still more preferably not more than 10 cm.

The fixed partition wall may be fixed to the connecting portion for the cultivation unit via a column(s) standing on the floor and/or a beam(s) extending from a wall(s), and/or may be connected to each of a plurality of cultivation units such that the plurality of cultivation units are linked to each other. In cases where a plurality of cultivation units are linked to each other via the fixed partition wall, the strength and the stability of the cultivation units or the cultivation unit group can be increased, and the accuracy of arrangement of the cultivation units, which is required in some cases, can be relatively easily secured.

The fixed partition wall is preferably one that can be used as a scaffold. Cases where the fixed partition wall is a scaffold are described below.

The scaffold is not limited as long as an operator or a technician can stay thereon in order to get access to the vicinity of the cultivated organisms or the cultivation equipment, for the purpose of observing or managing the growth state of the organisms, or controlling or maintaining cultivation devices related to water.

In particular, in cases where a support structure in which a plurality of organism containers are mounted at relatively high positions is used, the scaffold is placed at a position higher than the plane on which the support structure is placed, in order to improve the operability during predetermined operations by the operator or the technician.

Usually, the scaffold is fixed to the support structure and/or to the organism containers, to form a part of the cultivation unit. In cases where the scaffold is fixed to the support structure, carrying-in and taking-out of the organism containers can be carried out independently of the scaffold, which is preferred. Examples of the fixation method include a method in which the scaffold is fixed to the support structure directly or through a fixation member by a method such as screwing, bolting, welding, and/or adhesion, and a method in which a beam material given a fitting part or an irregular part is fixed to the support structure by the method described above, and a mounting member is then placed on the upper part of the beam material such that the mounting member fits the fitting part or the irregular part and stays at a fixed position, to provide the scaffold. In cases where the support structure has the mounting member as described above, the scaffold may be integrated with the mounting member. The fixation method for the scaffold may also be carried out in combination with a method in which the scaffold is fixed using a column(s) provided separately from the cultivation unit, and/or a beam(s) provided on a wall(s).

The scaffold has a flat shape having a horizontal area required for operation by the operator or the technician. In particular, from the viewpoint of allowing the operator or the technician to move and work safely, the scaffold preferably does not have unnecessary projections or irregularities on the surface. However, the scaffold may have small projections for safety, such as a checker plate. The size of the scaffold, in terms of the upper limit of the length between the end in the side of the support structure and/or the organism containers to which the scaffold is fixed, and the other end, is usually not more than 2 m, preferably not more than 1.5 m, more preferably not more than 1 m, still more preferably not more than 80 cm, and, in terms of the lower limit, the size is usually not less than 20 cm, preferably not less than 30 cm, more preferably not less than 50 cm, still more preferably not less than 70 cm. In cases where the size is not more than the upper limit described above, the space for placement of the scaffold can be prevented from becoming too large, and therefore the size of the entire organism cultivation facility can be reduced. Accordingly, the efficiencies of air conditioning and utilization of light can be increased. In cases where the size is not less than the lower limit described above, the operability for the operator or the technician can be secured.

The length of the scaffold in the direction along the support structure and/or the organism containers is usually not more than 100 m, preferably not more than 50 m, more preferably not more than 20 m, still more preferably not more than 15 m, and is usually not less than 50 cm, preferably not less than 1 m, more preferably not less than 3 m. In cases where this size is too large, the installation work is difficult, which is not preferred. On the other hand, in cases where the size is too small, the operability for the operator or the technician is low, which is not preferred.

The thickness of the scaffold is usually not more than 20 cm, preferably not more than 10 cm, more preferably not more than 5 cm, and is usually not less than 5 mm, preferably not less than 1 cm, more preferably not less than 2 cm. In cases where the thickness is not more than the upper limit described above, the weight of the scaffold can be reduced, and the installation work can be efficiently carried out. In cases where the thickness is not less than the lower limit described above, a strength necessary for the operator or the technician to stand on the scaffold can be easily secured. The height, from the floor, of the position where the scaffold is placed may be arbitrarily set as required. The height is usually not less than 1 m, more preferably not less than 1.5 m, still more preferably not less than 2 m, and is usually not more than 3 m. In cases where the height is too small, the significance of the height is low since such a height enables only a small amount of advantageous operations other than those which the operator or the technician can carry out by reaching the hands from the ground or the floor.

A plurality of scaffolds may be placed in the height direction. In such a case, the distance between the scaffolds in the height direction is usually not less than 1 m, preferably not less than 1.5 m, more preferably not less than 2 m, and is usually not more than 3 m, preferably not more than 2 m. In cases where the distance in the height direction is not less than the lower limit described above, a working space for the operator or the technician using the scaffolds can be secured, and the operator or the technician can work with ergonomically reasonable posture. In cases where the distance in the height direction is not more than the upper limit described above, the operator or the technician can reasonably reach for carrying out necessary operations by using an auxiliary equipment such as a stool on the floor or the scaffold, which is preferred.

The scaffold may be constituted by a single flat material and a beam material(s), or may be constituted by a plurality of flat materials and a beam material(s). The scaffold is preferably installed such that no large hole or gap is formed, so that stumbling or falling of the operator or the technician can be prevented when the operator or the technician moves or works on the scaffold. A handrail, lattice, wall, and/or the like may be installed on the scaffold.

The material of the scaffold is not limited, and examples of the material usually include resin materials such as fiber-reinforced plastics including FRP, and engineering plastics; metal materials such as carbon steel, stainless steel, and aluminum steel; and wood. Among these, metal materials are preferred because of their high strength. For the purpose of preventing corrosion, metal materials subjected to coating, passivation treatment, plating treatment, or the like may also be used. Metal materials are preferred also because of the fact that high thermal conductivity of the scaffold allows easy adjustment of the temperature of the organism cultivation facility, and allows easy control of the organism cultivation as a result.

Preferably, in order to minimize the space required for placement of the entire organism cultivation facility, and to make the air conditioning economically reasonable, the size of the scaffold is set to a minimum necessary size; the thickness of the scaffold is set to a minimum necessary thickness; and scaffolds having a simple shape with no unnecessary projections or irregularities are regularly arranged.

A plurality of cultivation units are preferably linked to each other through a scaffold(s). Since this allows free movement among the cultivation units, the work efficiency increases. In addition, the work efficiency for placement of the organism cultivation facility can be increased.

Cultivation of an organism requires water in most cases, and, for appropriate supply and discharge of the water, the cultivation equipment is required to have a high degree of horizontal accuracy. Normally, in cases where the cultivation equipment has a plurality of stages of organism containers, the support structure and, if necessary, organism containers, is/are temporarily assembled, and the horizontality is adjusted for each stage. In cases where a plurality of cultivation units are linked to each other through a scaffold(s), the work efficiency of the leveling is high since each individual cultivation unit is stable. Moreover, even if the cultivation unit is high and usually requires a tower wagon, use of such a tower wagon is unnecessary in this case.

Moreover, since the stress load in the transverse direction on the column of the support structure is reduced, the column can be made thin, and the cultivation unit becomes more resistant to shaking.

Further, when the organism cultivation facility according to the present invention has an equipment for feeding water to the organism containers, the amount of water supplied can be more easily stabilized since the horizontality can be easily secured. Since troubles tend to occur in the water section, the frequency of monitoring and maintenance need to be increased, and the scaffold can be effectively used for the monitoring and maintenance. Moreover, since pipes for supplying/draining water can be provided on the lower surface of the scaffold, the utilization efficiency of the space can be increased.

When the partition wall including the movable partition wall and the fixed partition wall is projected from the direction of the ceiling of the organism cultivation facility, the projected area of the partition wall is usually not less than 50%, preferably not less than 70%, more preferably not less than 75%, still more preferably not less than 80%, especially preferably not less than 90%, most preferably not less than 95% of the floor area of the building (excluding the area where the cultivation unit is present). The projected area of the partition wall is usually not more than 99%. In cases where the projected area of the partition wall satisfies the range described above, air conditioning in each of the spaces formed by division by the partition wall can be easily achieved.

The projected area of the partition wall is described below with reference to FIG. 9.

Figure 9:
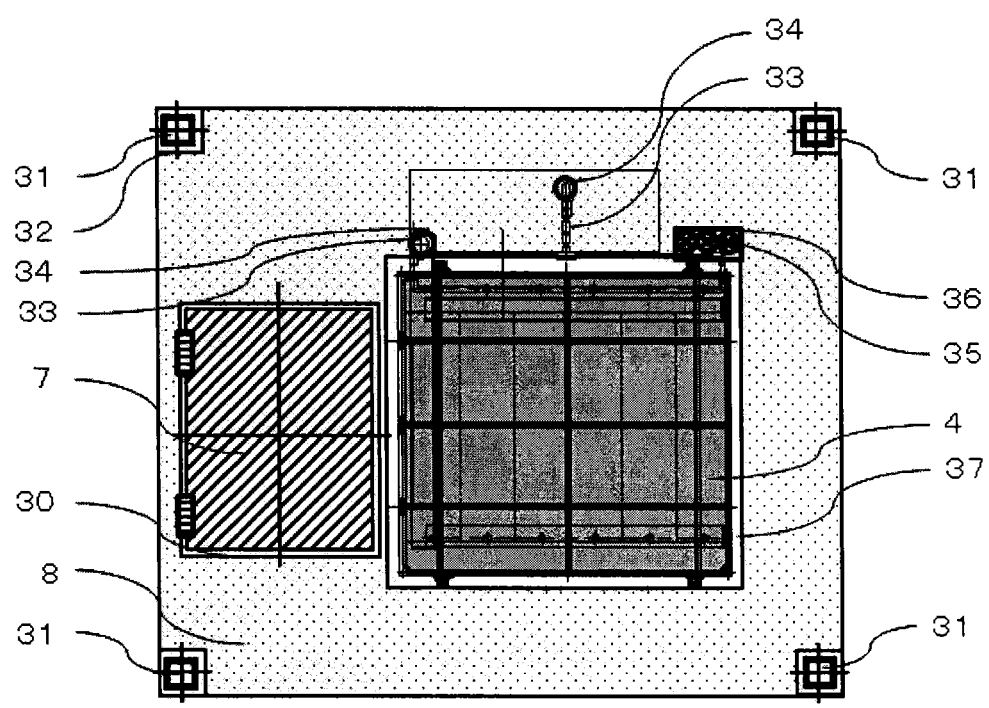
FIG. 9 is a projection drawing of the organism cultivation facility, prepared by projection of the facility from the direction of the ceiling.

FIG. 9 is a projection drawing of the organism cultivation facility, prepared by projection of the facility from the direction of the ceiling. A movable partition wall 7 and a fixed partition wall 8 are placed between a building 1 and a cultivation unit 4. The movable partition wall 7 and the fixed partition wall 8 form gaps with the walls of the building, columns 31, and the cultivation unit 4. Examples of the gaps include a gap 30 between the movable partition wall 7 and the fixed partition wall 8; a gap 32 between the columns 31 and the fixed partition wall 8 in cases where the building has the columns 31; a gap 34 between a pipe 33 and the fixed partition wall 8; a gap 36 between a wiring 35 and the fixed partition wall; and a gap 37 between the cultivation unit 4 and the fixed partition wall 8.

The ratio of these gaps is preferably as small as possible. However, since the horizontal cross-sectional shape of the building is complicated, the partition walls are constructed such that gaps are formed between the partition walls and the cultivation unit 4, the columns 31 of the building, the pipe 33, and the wiring 34. In order to increase the efficiency of the air conditioning, these gaps may be filled, if necessary.

The Simulation Example 2 was carried out under conditions where the projected area of the partition wall was 80% of the floor area of the building. By increasing this value, more strict temperature control can be carried out, and the reduction of the amount of protein synthesized in cultivation of a plant for protein synthesis can be further suppressed. The amount of protein synthesized can be increased to not less than 1.5 times, preferably not less than 2 times, more preferably not less than 3 times the amount of protein synthesized under conditions where the partition wall is absent.

INDUSTRIAL APPLICABILITY

The organism cultivation facility of the present invention can be widely used for cultivation of organisms, and is preferably used for plants, especially for leafy plants. In particular, the cultivation facility of the present invention is preferably used for cultivation of plants for pharmaceuticals, drug discovery, food, or health, and plants for which the gene recombination technology is used, which require relatively strict control within a narrow control range. Among these, the cultivation facility of the present invention is especially preferably used for plants such as leafy vegetables, *Arabidopsis thaliana*, and tobacco, for which results of practical application are accumulated. In particular, the organism cultivation facility of the present invention is preferably used for plants for protein synthesis. Use of this apparatus enables appropriate, high-quality, stable, industrial, inexpensive, and large-scale production of the organism and/or the protein.

While the invention has been described in detail and with reference to specific embodiments thereof, it will be apparent to one skilled in the art that various changes and modifications can be made therein without departing from the spirit and scope thereof.

DESCRIPTION OF SYMBOLS

1 Building
1-1 Floor
1-2 Wall
1-3 Ceiling
2 Organism container
3 Support structure
3-1 Column
3-2 Mounting member
3-3 Reflecting plate
4 Cultivation unit
5 Conveying device
5-1 Rail for conveying device
6 Stairs
7 Movable partition wall
8 Fixed partition wall
9 Air outlet
10 Air inlet
11 Lighting equipment
12 Electric wiring
13 Electric wiring
14 Water supply line
15 Water supply line
16 Water supply line
17 Air outlet duct
18 Air outlet
19 Air inlet
20 Air inlet duct
21 Variable load element
22 Pneumatic cylinder
23 Wind-up section
24 Wire
25 Rail for movable partition wall
26 Guide
30 Gap between movable partition wall and fixed partition wall
31 Column of building
32 Gap between column of building and fixed partition wall
33 Pipe
34 Gap between pipe and fixed partition wall
35 Wiring
36 Gap between wiring and fixed partition wall
37 Gap between cultivation unit and fixed partition wall

What is claimed is:

1. A plant cultivation facility for cultivating a plant for protein synthesis, the plant cultivation facility comprising, in a building having a floor, a wall, and a ceiling:
    a cultivation unit having plant containers capable of storing plants, and a support structure that supports the plant containers on a plurality of vertically arranged stages, said cultivation unit occupying a cultivation space;
    a conveying device capable of vertically moving the plant containers in the cultivation unit for arranging the plant containers in the cultivation unit;
    one or more partition walls that can vertically divide a building space in the building into two or more control spaces, wherein at least a part of the one or more partition walls has a movable section that forms an opening section allowing for vertical movement of the conveying device through the opening section; and
    an air outlet and an air inlet of an air conditioner in at least each of the two or more control spaces divided by the one or more partition walls,
    wherein:
    the one or more partition walls are situated at a higher level in the building space than the floor of the building;
    the one or more partition walls do not vertically divide the cultivation space containing the cultivation unit; and
    a gap exists between the one or more partition walls and the cultivation space, such that the one or more partition walls are not connected to the support structure and do not support the support structure or the plant containers.

2. The plant cultivation facility according to claim 1, wherein said building is a building in which said cultivation space, said conveying device, and said one or more partition walls can be made into a closed system.

3. The plant cultivation facility according to claim 1, wherein said air outlet and said air inlet of the air conditioner are arranged on wall surfaces facing each other in at least each of said control spaces divided by said one or more partition walls.

4. The plant cultivation facility according to claim 1, wherein the plant cultivation facility comprises a plurality of cultivation units arranged adjacent to each other along long sides thereof.

5. The plant cultivation facility according to claim 1, wherein said opening section formed by said movable section is provided in a short-side side of said cultivation unit.

6. The plant cultivation facility according to claim 1, wherein said opening section formed by said movable section of said partition wall is provided at an air inlet side of said cultivation unit.

7. The plant cultivation facility according to claim 1, wherein said conveying device is arranged in a space formed between a short side of said cultivation unit and a wall surface facing said short side of said cultivation unit.

8. The plant cultivation facility according to claim 1, wherein said support structure of said cultivation unit has a conveyor that moves said plant containers along a long-side direction of said cultivation unit.

9. The plant cultivation facility according to claim 1, wherein said plant cultivation facility is adapted to function as a cultivation facility for cultivating a plant for protein synthesis having a recombinant gene.

10. The plant cultivation facility according to claim 1, wherein, when said partition wall is projected from a direction of the ceiling of said plant cultivation facility, a projected area of said partition all is not less than 70% of a floor area of said building.

* * * * *